(12) United States Patent
He et al.

(10) Patent No.: US 9,942,928 B2
(45) Date of Patent: Apr. 10, 2018

(54) ROUTING METHOD BETWEEN BASE STATIONS, SERVING GATEWAY, AND BASE STATION

(71) Applicant: Huawei Technologies Co., Ltd., Shenzhen, Guangdong (CN)

(72) Inventors: Ning He, Shenzhen (CN); Chunshan Xiong, Beijing (CN); Hinghung Anthony Chan, Plano, TX (US); Lei Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 167 days.

(21) Appl. No.: 15/133,919

(22) Filed: Apr. 20, 2016

(65) Prior Publication Data

US 2016/0262197 A1 Sep. 8, 2016

Related U.S. Application Data

(63) Continuation of application No. PCT/CN2013/085606, filed on Oct. 21, 2013.

(51) Int. Cl.
| | |
|---|---|
| *H04W 4/00* | (2009.01) |
| *H04W 76/02* | (2009.01) |
| *H04W 40/02* | (2009.01) |
| *H04W 76/00* | (2018.01) |
| *H04W 40/34* | (2009.01) |
| *H04W 88/16* | (2009.01) |

(52) U.S. Cl.
CPC ......... *H04W 76/022* (2013.01); *H04W 40/02* (2013.01); *H04W 40/34* (2013.01); *H04W 76/00* (2013.01); *H04W 88/16* (2013.01)

(58) Field of Classification Search
CPC ...................................................... H04W 40/02
USPC ........................................................ 370/328
See application file for complete search history.

(56) References Cited

U.S. PATENT DOCUMENTS

| | | | | |
|---|---|---|---|---|
| 5,724,665 | A | * | 3/1998 | Abbasi .................. H04W 36/30 455/465 |
| 5,729,826 | A | * | 3/1998 | Gavrilovich .......... H04W 88/08 455/11.1 |

(Continued)

FOREIGN PATENT DOCUMENTS

| | | |
|---|---|---|
| CN | 101540992 A | 9/2009 |
| CN | 101656992 A | 2/2010 |

(Continued)

*Primary Examiner* — Shripal K Khajuria

(57) ABSTRACT

Embodiments of the present invention provide a routing method between base stations, a serving gateway, and a base station, where the method includes: receiving, by a first serving gateway, a first user data packet of first UE sent by a first base station, and determining, according to the first user data packet, whether the first serving gateway serves both the first UE and second UE, where the second UE is a communication peer end of the first UE; and if the first serving gateway determines that the first serving gateway serves both the first UE and the second UE, triggering, by the first serving gateway, the first base station to acquire first routing information required for direct communication with a second base station, and triggering the second base station to acquire second routing information required for direct communication with the first base station.

20 Claims, 7 Drawing Sheets

(56) References Cited

U.S. PATENT DOCUMENTS

| | | | |
|---|---|---|---|
| 2011/0235546 A1* | 9/2011 | Horn | H04L 12/66 370/254 |
| 2011/0292885 A1* | 12/2011 | Cuervo | H04L 41/0663 370/329 |
| 2013/0034057 A1* | 2/2013 | Aramoto | H04W 36/0011 370/328 |

FOREIGN PATENT DOCUMENTS

| | | |
|---|---|---|
| CN | 101998365 A | 3/2011 |
| EP | 2 348 787 A1 | 7/2011 |
| WO | WO 2011/129273 A1 | 10/2011 |
| WO | WO 2015/013883 A1 | 2/2015 |

* cited by examiner

ROUTING METHOD BETWEEN BASE STATIONS, SERVING GATEWAY, AND BASE STATION

CROSS-REFERENCE TO RELATED APPLICATIONS

This application is a continuation of International Application No. PCT/CN2013/085606, filed on Oct. 21, 2013, which is hereby incorporated by reference in its entirety.

TECHNICAL FIELD

The present invention relates to communications technologies, and in particular, to a routing method between base stations, a serving gateway, and a base station.

BACKGROUND

When user equipment (UE) is powered on and is attached to a network, an evolved NodeB (eNB) selects a proper mobility management entity (MME) that serves the UE, and then the MME selects a proper serving gateway (S-GW) and a proper packet data network gateway (P-GW) that serve the UE. A data packet transmitted by the UE is transmitted over an evolved packet system (EPS) bearer between the UE and the P-GW, and each EPS bearer includes three parts: a radio bearer between UE and a base station, an S1 bearer between the base station and an S-GW, and an S5/S8 bearer between the S-GW and a P-GW.

Functions executed by the P-GW on the data packet mainly include lawful interception, charging, filtering a data packet of an external PDN network, and the like. When two UEs perform communication by using a same P-GW and the foregoing actions do not need to be performed (for example, lawful interception and monthly charging of a user are not performed), a manner of optimizing a route between S-GWs may be used, so that data does not pass through the P-GW. When S-GWs of two networks communicate directly, a routing loss is reduced. When two UEs are served by a same S-GW, and a base station 1 receives user data, the base station 1 routes the user data to the S-GW according to a method in the prior art, and the S-GW sends the user data to a base station 2, where the S-GW executes only a forwarding function, which causes non-optimum routing and causes a delay.

SUMMARY

Embodiments of the present invention provides a routing method between base stations, a serving gateway, and a base station, so that two base stations can directly establish a direct connection, to perform communication without a need to use a serving gateway.

A first aspect of the present invention provides a routing method between base stations, including:

receiving, by a first serving gateway, a first user data packet of first user equipment UE sent by a first base station, and determining, according to the first user data packet, whether the first serving gateway serves both the first UE and second UE, where the second UE is a communication peer end of the first UE; and if the first serving gateway determines that the first serving gateway serves both the first UE and the second UE, triggering, by the first serving gateway, the first base station to acquire first routing information required for direct communication with a second base station, and triggering, by the first serving gateway, the second base station to acquire second routing information required for direct communication with the first base station, so that the first base station and the second base station establish a direct connection according to the first routing information and the second routing information, where the second base station serves the second UE.

In a first possible implementation manner of the first aspect of the present invention, the first routing information includes at least an IP address of the second UE, an IP address of the second base station, and a second tunnel endpoint identifier of a communication tunnel between the first base station and the second base station, and the second routing information includes at least an IP address of the first UE, an IP address of the first base station, and a first tunnel endpoint identifier of the communication tunnel between the second base station and the first base station.

With reference to the first aspect of the present invention and the first possible implementation manner of the first aspect, in a second possible implementation manner of the first aspect of the present invention, the determining, according to the first user data packet, whether the first serving gateway serves both the first UE and second UE includes:

acquiring, by the first serving gateway, bearer infoLmation of the second UE according to the IP address of the second UE included in the first user data packet, where the bearer information includes information about a second serving gateway that serves the second UE; and determining, by the first serving gateway according to the information that is included in the bearer information of the second UE and is about the second serving gateway that serves the second UE, whether the first serving gateway also serves the second UE, and if the first serving gateway determines that the first serving gateway also serves the second UE, determining, by the first serving gateway, that the first serving gateway serves both the first UE and the second UE.

With reference to the first aspect of the present invention and the first possible implementation manner of the first aspect, in a third possible implementation manner of the first aspect of the present invention, the determining, according to the first user data packet, whether the first serving gateway serves both the first UE and second UE includes:

recording, by the first serving gateway, quintuple information of the first user data packet; and receiving, by the first serving gateway, a second user data packet sent by a packet data network gateway that serves the second UE, determining whether quintuple information of the second user data packet is the same as the quintuple information of the first user data packet, and if the quintuple information of the second user data packet is the same as the quintuple information of the first user data, determining that the first serving gateway serves both the first UE and the second UE.

With reference to the first aspect of the present invention and the first to the third possible implementation manners of the first aspect, in a fourth possible implementation manner of the first aspect of the present invention, the triggering, by the first serving gateway, the first base station to acquire first routing information required for direct communication with a second base station, and triggering the second base station to acquire second routing information required for direct communication with the first base station, so that the first base station and the second base station establish a direct connection according to the first routing information and the second routing information includes:

sending, by the first serving gateway, the first routing information to the first base station by using a first mobility management entity MME that serves the first UE, and sending the second routing information to the second base station by using a second MME that serves the second UE, so that the first base station and the second base station establish the direct connection according to the first routing information and the second routing information.

With reference to the first aspect of the present invention and the first to the third possible implementation manners of the first aspect, in a fifth possible implementation manner of the first aspect of the present invention, the triggering, by the first serving gateway, the first base station to acquire first routing information required for direct communication with a second base station, and triggering the second base station to acquire second routing information required for direct communication with the first base station, so that the first base station and the second base station establish a direct connection according to the first routing information and the second routing information includes:

sending, by the first serving gateway, a first bearer update request to a first MME that serves the first UE, where the first update bearer request message includes the IP address of the second UE, an identifier of the second UE, and a radio bearer identifier of the second UE, so that the first MME acquires the IP address of the second base station according to the identifier of the second UE, and sends a first bearer modify request to the first base station, where the first bearer modify request includes the IP address of the second UE, the identifier of the second UE, the radio bearer identifier of the second UE, and the IP address of the second base station, so that the first base station acquires the first routing information according to the IP address of the second UE, the radio bearer identifier of the second UE, and the IP address of the second base station that are included in the first bearer modify request, and sends a second bearer update request to the second base station, where the second bearer update request includes the second routing information, so that the first base station and the second base station establish the direct connection according to the first routing information and the second routing information.

With reference to the first aspect of the present invention and the first to the third possible implementation manners of the first aspect, in a sixth possible implementation manner of the first aspect of the present invention, the triggering, by the first serving gateway, the first base station to acquire first routing information required for direct communication with a second base station, and triggering the second base station to acquire second routing information required for direct communication with the first base station, so that the first base station and the second base station establish a direct connection according to the first routing information and the second routing information includes:

sending, by the first serving gateway, a first bearer update request to the first base station, where the first bearer update request includes the first routing information; and sending a second bearer update request to the second base station, where the second bearer update request message includes the second routing information, so that the first base station and the second base station establish the direct connection according to the first routing information and the second routing information.

With reference to the first aspect of the present invention and the first to the third possible implementation manners of the first aspect, in a seventh possible implementation manner of the first aspect of the present invention, the triggering, by the first serving gateway, the first base station to acquire first routing information required for direct communication with a second base station, and triggering the second base station to acquire second routing information required for direct communication with the first base station, so that the first base station and the second base station establish a direct connection according to the first routing information and the second routing information includes:

sending, by the first serving gateway, a first bearer update request to the first base station, where the first bearer update request message includes the IP address of the second UE, an identifier of the second UE, the IP address of the second base station, and a radio bearer identifier of the second UE, so that the first base station acquires the first routing information according to the first bearer update request, and sends a second bearer update request to the second base station according to the IP address of the second base station, where the second bearer update request includes the second routing information, so that the first base station and the second base station establish the direct connection according to the first routing information and the second routing information.

In an eighth possible implementation manner of the first aspect of the present invention, the method further includes: after the first base station and the second base station successfully establish the direct connection, deleting, by the first serving gateway, bearer information of the first UE stored by the first serving gateway, and deleting bearer information of the second UE.

A second aspect of the present invention provides a routing method between base stations, including:

sending, by a first base station, a first user data packet of first UE to a first serving gateway, so that the first serving gateway determines, according to the first user data packet, whether the first serving gateway serves both the first UE and second UE, where if the first serving gateway determines that the first serving gateway serves both the first UE and the second UE, the first serving gateway triggers the first base station to acquire first routing information required for direct communication with a second base station, and triggers the second base station to acquire second routing information required for communication with the first base station, so that the first base station and the second base station establish a direct connection according to the first routing information and the second routing information, where the second UE is a communication peer end of the first UE, and the second base station serves the second UE; and acquiring, by the first base station, the first routing information according to the triggering by the first serving gateway, and establishing the direct connection with the second base station according to the first routing information.

In a first possible implementation manner of the second aspect of the present invention, the first routing information includes at least an IP address of the second UE, an IP address of the second base station, and a second tunnel endpoint identifier of a communication tunnel between the first base station and the second base station, and the second routing information includes at least an IP address of the first UE, an IP address of the first base station, and a first tunnel endpoint identifier of the communication tunnel between the second base station and the first base station.

With reference to the second aspect of the present invention and the first possible implementation manner of the second aspect, in a second possible implementation manner of the second aspect of the present invention, the acquiring, by the first base station, the first routing information according to the triggering by the first serving gateway includes:

receiving, by the first base station, a first bearer update request sent by the first serving gateway by using a first MME that serves the first UE, where the first bearer update request includes the first routing information.

With reference to the second aspect of the present invention and the first possible implementation manner of the second aspect, in a third possible implementation manner of the second aspect of the present invention, the acquiring, by the first base station, the first routing information according to the triggering by the first serving gateway includes:

receiving, by the first base station, a first bearer modify request sent by a first MME that serves the first UE, where the first bearer modify request includes the IP address of the second UE, the IP address of the second base station, and a bearer identifier of the second UE, and the first bearer modify request is sent to the first base station in a process in which after receiving a first bearer update request sent by the first serving gateway, the first MME acquires the IP address of the second base station according to an identifier of the second UE included in the first update bearer request message, and adds the IP address of the second base station to the first bearer modify request;

acquiring, by the first base station, the first routing information according to the IP address of the second UE, the radio bearer identifier of the second UE, and the IP address of the second base station that are included in the first bearer modify request; and sending, by the first base station, a second bearer update request to the second base station, where the second bearer update request includes the second routing information, so that the first base station and the second base station establish the direct connection according to the first routing information and the second routing information.

With reference to the second aspect of the present invention and the first possible implementation manner of the second aspect, in a fourth possible implementation manner of the second aspect of the present invention, the acquiring, by the first base station, the first routing information according to the triggering by the first serving gateway includes:

receiving, by the first base station, a first bearer update request sent by the first serving gateway, where the first bearer update request includes the first routing information.

With reference to the second aspect of the present invention and the first possible implementation manner of the second aspect, in a fifth possible implementation manner of the second aspect of the present invention, the acquiring, by the first base station, the first routing information according to the triggering by the first serving gateway includes:

receiving, by the first base station, a first bearer update request sent by the first serving gateway, where the first bearer update request message includes the IP address of the second UE, an identifier of the second UE, the IP address of the second base station, and a radio bearer identifier of the second UE;

acquiring, by the first base station, the first routing information according to the first bearer update request; and sending a second bearer update request to the second base station according to the IP address of the second base station, where the second bearer update request includes the second routing information, so that the first base station and the second base station establish the direct connection according to the first routing information and the second routing information.

A third aspect of the present invention provides a serving gateway, where the serving gateway is a first serving gateway and includes:

a receiving module, configured to receive a first user data packet of first user equipment UE sent by a first base station;

a determining module, configured to determine, according to the first user data packet received by the receiving module, whether the first serving gateway serves both the first UE and second UE, where the second UE is a communication peer end of the first UE; and a triggering module, configured to: after the determining module determines that the first serving gateway serves both the first UE and the second UE, trigger the first base station to acquire first routing information required for direct communication with a second base station, and trigger the second base station to acquire second routing information required for direct communication with the first base station, so that the first base station and the second base station establish a direct connection according to the first routing information and the second routing information, where the second base station serves the second UE.

In a first possible implementation manner of the third aspect of the present invention, the first routing infoilnation includes at least an IP address of the second UE, an IP address of the second base station, and a second tunnel endpoint identifier of a communication tunnel between the first base station and the second base station, and the second routing information includes at least an IP address of the first UE, an IP address of the first base station, and a first tunnel endpoint identifier of the communication tunnel between the second base station and the first base station.

With reference to the third aspect of the present invention and the first possible implementation manner of the third aspect, in a second possible implementation manner of the third aspect of the present invention, the determining module includes:

a bearer information acquiring unit, configured to acquire bearer information of the second UE according to the IP address of the second UE included in the first user data packet, where the bearer information of the second UE includes information about a second serving gateway that serves the second UE; and a first serving gateway determining unit, configured to determine, according to the information that is included in the bearer information of the second UE acquired by the bearer information acquiring unit and is about the second serving gateway that serves the second UE, whether the first serving gateway also serves the second UE, and if it is determined that the first serving gateway also serves the second UE, determine that the first serving gateway serves both the first UE and the second UE.

With reference to the third aspect of the present invention and the first possible implementation manner of the third aspect, in a third possible implementation manner of the third aspect of the present invention, the determining module includes:

a recording unit, configured to record quintuple information of the first user data packet; and a second serving gateway determining unit, configured to: after the receiving module receives a second user data packet sent by a packet data network gateway that serves the second UE, determine whether quintuple information of the second user data packet is the same as the quintuple information of the first user data packet, and if the quintuple information of the second user data packet is the same as the quintuple information of the first user data, deter nine that the first serving gateway serves both the first UE and the second UE.

With reference to the third aspect of the present invention and the first to the third possible implementation manners of the third aspect, in a fourth possible implementation manner of the third aspect of the present invention, the triggering module is specifically configured to:

send the first routing information to the first base station by using a first mobility management entity MME that serves the first UE, and send the second routing information to the second base station by using a second MME that serves the second UE, so that the first base station and the second base station establish the direct connection according to the first routing information and the second routing information.

With reference to the third aspect of the present invention and the first to the third possible implementation manners of the third aspect, in a fifth possible implementation manner of the third aspect of the present invention, the triggering module is specifically configured to:

send a first bearer update request to a first MME that serves the first UE, where the first update bearer request message includes the IP address of the second UE, an identifier of the second UE, and a radio bearer identifier of the second UE, so that the first MME acquires the IP address of the second base station according to the identifier of the second UE, and sends a first bearer modify request to the first base station, where the first bearer modify request includes the IP address of the second UE, the radio bearer identifier of the second UE, and the IP address of the second base station, so that the first base station acquires the first routing information according to the IP address of the second UE, the radio bearer identifier of the second UE, and the IP address of the second base station that are included in the first bearer modify request, and sends a second bearer update request to the second base station, where the second bearer update request includes the second routing information, so that the first base station and the second base station establish the direct connection according to the first routing information and the second routing information.

With reference to the third aspect of the present invention and the first to the third possible implementation manners of the third aspect, in a sixth possible implementation manner of the third aspect of the present invention, the triggering module is specifically configured to:

send a first bearer update request to the first base station, where the first bearer update request includes the first routing information; and send a second bearer update request to the second base station, where the second bearer update request message includes the second routing information, so that the first base station and the second base station establish the direct connection according to the first routing information and the second routing information.

With reference to the third aspect of the present invention and the first to the third possible implementation manners of the third aspect, in a seventh possible implementation manner of the third aspect of the present invention, the triggering module is specifically configured to:

send a first bearer update request to the first base station, where the first bearer update request message includes the IP address of the second UE, an identifier of the second UE, the IP address of the second base station, and a radio bearer identifier of the second UE, so that the first base station acquires the first routing information according to the first bearer update request, and sends a second bearer update request to the second base station according to the IP address of the second base station, where the second bearer update request includes the second routing information, so that the first base station and the second base station establish the direct connection according to the first routing information and the second routing information.

In an eighth possible implementation manner of the third aspect of the present invention, the serving gateway further includes:

a deleting module, configured to: after the first base station and the second base station successfully establish the direct connection, delete bearer information of the first UE stored by the first serving gateway, and delete bearer information of the second UE.

A fourth aspect of the present invention provides a base station, where the base station is a first base station and includes:

a sending module, configured to send a first user data packet of first UE to a first serving gateway, so that the first serving gateway determines, according to the first user data packet, whether the first serving gateway serves both the first UE and second UE, where if the first serving gateway determines that the first serving gateway serves both the first UE and the second UE, the first serving gateway triggers the first base station to acquire first routing information required for direct communication with a second base station, and triggers the second base station to acquire second routing information required for communication with the first base station, so that the first base station and the second base station establish a direct connection according to the first routing information and the second routing information, where the second UE is a communication peer end of the first UE, and the second base station serves the second UE; and a routing information acquiring module, configured to: acquire the first routing information according to the triggering by the first serving gateway, and establish the direct connection with the second base station according to the first routing information.

In a first possible implementation manner of the fourth aspect of the present invention, the first routing information includes at least an IP address of the second UE, an IP address of the second base station, and a second tunnel endpoint identifier of a communication tunnel between the first base station and the second base station, and the second routing information includes at least an IP address of the first UE, an IP address of the first base station, and a first tunnel endpoint identifier of the communication tunnel between the second base station and the first base station.

With reference to the fourth aspect of the present invention and the first possible implementation manner of the fourth aspect, in a second possible implementation manner of the fourth aspect of the present invention, the routing information acquiring module is specifically configured to:

receive a first bearer update request sent by the first serving gateway by using a first MME that serves the first UE, where the first bearer update request includes the first routing information.

With reference to the fourth aspect of the present invention and the first possible implementation manner of the fourth aspect, in a third possible implementation manner of the fourth aspect of the present invention, the routing information acquiring module is specifically configured to:

receive a first bearer modify request sent by a first MME that serves the first UE, where the first bearer modify request includes the IP address of the second UE, the IP address of the second base station, and a bearer identifier of the second UE, and the first bearer modify request is sent to the first base station in a process in which after receiving a first bearer update request sent by the first serving gateway, the first MME acquires the IP address of the second base station according to an identifier address of the second UE included in the first update bearer request message, and adds the IP address of the second base station to the first bearer modify request;

acquire the first routing information according to the IP address of the second UE, the radio bearer identifier of the second UE, and the IP address of the second base station that are included in the first bearer modify request; and send a second bearer update request to the second base station, where the second bearer update request includes the second routing information, so that the first base station and the second base station establish the direct connection according to the first routing information and the second routing information.

With reference to the fourth aspect of the present invention and the first possible implementation manner of the fourth aspect, in a fourth possible implementation manner of the fourth aspect of the present invention, the routing information acquiring module is specifically configured to:

receive a first bearer update request sent by the first serving gateway, where the first bearer update request includes the first routing information.

With reference to the fourth aspect of the present invention and the first possible implementation manner of the fourth aspect, in a fifth possible implementation manner of the fourth aspect of the present invention, the routing information acquiring module is specifically configured to:

receive a first bearer update request sent by the first serving gateway, where the first bearer update request message includes the IP address of the second UE, an identifier of the second UE, the IP address of the second base station, and a radio bearer identifier of the second UE;

acquire the first routing information according to the first bearer update request; and send a second bearer update request to the second base station according to the IP address of the second base station, where the second bearer update request includes the second routing information, so that the first base station and the second base station establish the direct connection according to the first routing information and the second routing information.

A fifth aspect of the present invention provides a serving gateway, where the serving gateway is a first serving gateway and includes:

a receiver, configured to receive a first user data packet of first user equipment UE sent by a first base station;

a processor, configured to determine, according to the first user data packet, whether the first serving gateway serves both the first UE and second UE, where the second UE is a communication peer end of the first UE; and a transmitter, configured to: after the processor determines that the first serving gateway serves both the first UE and the second UE, trigger the first base station to acquire first routing information required for direct communication with a second base station, and trigger, by the processor, the second base station to acquire second routing information required for direct communication with the first base station, so that the first base station and the second base station establish a direct connection according to the first routing information and the second routing information, where the second base station serves the second UE.

In a first possible implementation manner of the fifth aspect of the present invention, the first routing information includes at least an IP address of the second UE, an IP address of the second base station, and a second tunnel endpoint identifier of a communication tunnel between the first base station and the second base station, and the second routing information includes at least an IP address of the first UE, an IP address of the first base station, and a first tunnel endpoint identifier of the communication tunnel between the second base station and the first base station.

With reference to the fifth aspect of the present invention and the first possible implementation manner of the fifth aspect, in a second possible implementation manner of the fifth aspect of the present invention, the processor is specifically configured to:

acquire bearer information of the second UE according to the IP address of the second UE included in the first user data packet, where the bearer information includes infoLluation about a second serving gateway that serves the second UE; and determine, according to the information that is included in the bearer information of the second UE and is about the second serving gateway that serves the second UE, whether the first serving gateway also serves the second UE, and if it is determined that the first serving gateway also serves the second UE, determine that the first serving gateway serves both the first UE and the second UE.

With reference to the fifth aspect of the present invention and the first possible implementation manner of the fifth aspect, in a third possible implementation manner of the fifth aspect of the present invention, the processor is specifically configured to:

record quintuple information of the first user data packet; and the receiver further receives a second user data packet sent by a packet data network gateway that serves the second UE, determines whether quintuple information of the second user data packet is the same as the quintuple information of the first user data packet, and if the quintuple information of the second user data packet is the same as the quintuple information of the first user data packet, determines that the first serving gateway serves both the first UE and the second UE.

With reference to the fifth aspect of the present invention and the first to the third possible implementation manners of the fifth aspect, in a fourth possible implementation manner of the fifth aspect of the present invention, the transmitter is specifically configured to:

send the first routing information to the first base station by using a first mobility management entity MME that serves the first UE, and send the second routing information to the second base station by using a second MME that serves the second UE, so that the first base station and the second base station establish the direct connection according to the first routing information and the second routing information.

With reference to the fifth aspect of the present invention and the first to the third possible implementation manners of the fifth aspect, in a fifth possible implementation manner of the fifth aspect of the present invention, the transmitter is specifically configured to:

send a first bearer update request to a first MME that serves the first UE, where the first update bearer request message includes the IP address of the second UE, an identifier of the second UE, and a radio bearer identifier of the second UE, so that the first MME acquires the IP address of the second base station according to the identifier of the second UE, and sends a first bearer modify request to the first base station, where the first bearer modify request includes the IP address of the second UE, the radio bearer identifier of the second UE, and the IP address of the second base station, so that the first base station acquires the first routing information according to the IP address of the second UE, the radio bearer identifier of the second UE, and the IP address of the second base station that are included in the first bearer modify request, and sends a second bearer update request to the second base station, where the second bearer update request includes the second routing information, so that the first base station and the second base station establish the direct connection according to the first routing information and the second routing information.

With reference to the fifth aspect of the present invention and the first to the third possible implementation manners of the fifth aspect, in a sixth possible implementation manner of the fifth aspect of the present invention, the transmitter is specifically configured to:

send a first bearer update request to the first base station, where the first bearer update request includes the first routing information; and send a second bearer update request to the second base station, where the second bearer update request message includes the second routing information, so that the first base station and the second base station establish the direct connection according to the first routing information and the second routing information.

With reference to the fifth aspect of the present invention and the first to the third possible implementation manners of the fifth aspect, in a seventh possible implementation manner of the fifth aspect of the present invention, the transmitter is specifically configured to:

send a first bearer update request to the first base station, where the first bearer update request message includes the IP address of the second UE, an identifier of the second UE, the IP address of the second base station, and a radio bearer identifier of the second UE, so that the first base station acquires the first routing information according to the first bearer update request, and sends a second bearer update request to the second base station according to the IP address of the second base station, where the second bearer update request includes the second routing information, so that the first base station and the second base station establish the direct connection according to the first routing information and the second routing information.

In an eighth possible implementation manner of the fifth aspect of the present invention, the processor is further configured to:

after the first base station and the second base station successfully establish the direct connection, delete bearer information of the first UE stored by the first serving gateway, and delete bearer information of the second UE.

A sixth aspect of the present invention provides a base station, where the base station is a first base station and includes:

a transmitter, configured to send a first user data packet of first UE to a first serving gateway, so that the first serving gateway determines, according to the first user data packet, whether the first serving gateway serves both the first UE and second UE, where if the first serving gateway determines that the first serving gateway serves both the first UE and the second UE, the first serving gateway triggers the first base station to acquire first routing information required for direct communication with a second base station, and the first serving gateway triggers the second base station to acquire second routing information required for communication with the first base station, so that the first base station and the second base station establish a direct connection according to the first routing information and the second routing information, where the second UE is a communication peer end of the first UE, and the second base station serves the second UE; and a processor, configured to acquire the first routing information according to the triggering by the first serving gateway, and establish the direct connection with the second base station according to the first routing information.

In a first possible implementation manner of the sixth aspect of the present invention, the first routing information includes at least an IP address of the second UE, an IP address of the second base station, and a second tunnel endpoint identifier of a communication tunnel between the first base station and the second base station, and the second routing information includes at least an IP address of the first UE, an IP address of the first base station, and a first tunnel endpoint identifier of the communication tunnel between the second base station and the first base station.

With reference to the sixth aspect of the present invention and the first possible implementation manner of the sixth aspect, in a second possible implementation manner of the sixth aspect of the present invention, the base station further includes:

a receiver, configured to receive a first bearer update request sent by the first serving gateway by using a first MME that serves the first UE, where the first bearer update request includes the first routing information.

With reference to the sixth aspect of the present invention and the first possible implementation manner of the sixth aspect, in a third possible implementation manner of the sixth aspect of the present invention, the base station further includes:

a receiver, configured to receive a first bearer modify request sent by a first MME that serves the first UE, where the first bearer modify request includes the IP address of the second UE, the IP address of the second base station, and a bearer identifier of the second UE, and the first bearer modify request is sent to the first base station in a process in which after receiving a first bearer update request sent by the first serving gateway, the first MME acquires the IP address of the second base station according to an identifier address of the second UE included in the first update bearer request message, and adds the IP address of the second base station to the first bearer modify request;

the processor is specifically configured to acquire the first routing information according to the IP address of the second UE, the radio bearer identifier of the second UE, and the IP address of the second base station that are included in the first bearer modify request; and the transmitter is further configured to send a second bearer update request to the second base station, where the second bearer update request includes the second routing information, so that the first base station and the second base station establish the direct connection according to the first routing information and the second routing information.

With reference to the sixth aspect of the present invention and the first possible implementation manner of the sixth aspect, in a fourth possible implementation manner of the sixth aspect of the present invention, the base station further includes:

a receiver, configured to receive a first bearer update request sent by the first serving gateway, where the first bearer update request includes the first routing information.

With reference to the sixth aspect of the present invention and the first possible implementation manner of the sixth aspect, in a fifth possible implementation manner of the sixth aspect of the present invention, the base station further includes:

a receiver, further configured to receive a first bearer update request sent by the first serving gateway, where the first bearer update request message includes the IP address of the second UE, an identifier of the second UE, the IP address of the second base station, and a radio bearer identifier of the second UE;

the processor is specifically configured to acquire the first routing information according to the first bearer update request; and the transmitter is further configured to send a second bearer update request to the second base station according to the IP address of the second base station, where the second bearer update request includes the second routing information, so that the first base station and the second base station establish the direct connection according to the first routing information and the second routing information.

According to the method provided in the embodiments of the present invention, when receiving a user data packet of first UE sent by a first base station, a first S-GW determines whether the first serving gateway serves both the first UE and second UE, where the second UE and the first UE are communication peer ends; and when determining that the first serving gateway serves both the first UE and the second UE, the first S-GW triggers the first base station to acquire first routing information required for direct communication with a second base station, and triggers the second base station to acquire second routing information required for direct communication with the first base station, so that the first base station and the second base station can establish a direct connection according to the first routing information and the second routing information, and the connection does not need to be established by using the first S-GW. Therefore, a route between the two base stations is more optimal, and a transmission delay of the data packet is also reduced.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
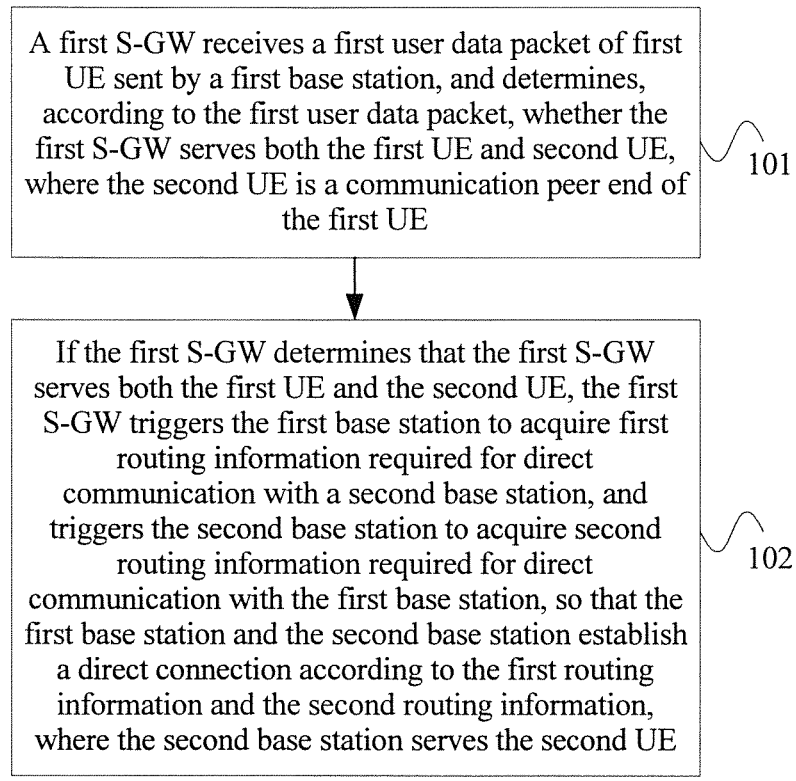
FIG. 1 is a flowchart of an embodiment of a routing method between base stations according to the present invention.

FIG. 1 is a flowchart of an embodiment of a routing method between base stations according to the present invention. As shown in FIG. 1, the method provided in this embodiment includes the following steps:

Step 101: A first S-GW receives a first user data packet of first UE sent by a first base station, and determines, according to the first user data packet, whether the first S-GW serves both the first UE and second UE, where the second UE is a communication peer end of the first UE.

When the first UE is to send data, the first UE first sends the first user data packet to the first base station by using a radio bearer between the first UE and the first base station. Then, the first base station sends the data packet to the first S-GW by using an S1 bearer between the first base station and the first S-GW, where both the first base station and the first S-GW serve the first UE, and when receiving the first user data packet from an S1 interface, the first S-GW determines, according to the first user data packet, whether the first S-GW serves both the first UE and the second UE, where the second UE is the communication peer end of the first UE.

Specifically, the first S-GW may determine, in the following manners, whether the first S-GW serves both the first UE and the second UE.

First manner: The first S-GW acquires bearer information of the second UE according to an IP address of the second UE included in the first user data packet, where the bearer information includes information about a second S-GW that serves the second UE; the first S-GW determines, according to the information that is included in the bearer information of the second UE and is about the second S-GW that serves the second UE, whether the first S-GW also serves the second UE; and if the first S-GW determines that the first S-GW also serves the second UE, the first S-GW determines that the first S-GW serves both the first UE and the second UE.

Specifically, the first S-GW searches locally stored bearer information of all UEs for the bearer information of the second UE according to the IP address of the second UE, and when the bearer information of the second UE is found, and the information that is recorded in the bearer information and is about the second S-GW that serves the second UE is the same as information about the first S-GW, it indicates that the second S-GW that serves the second UE is the first S-GW, and therefore, the first S-GW determines that the first S-GW serves both the first UE and the second UE. If the first S-GW does not find the bearer information of the second UE from the locally stored bearer information of all the UEs, and an attribute of the IP address of the second UE is an Operator type, where an IP address of the Operator type indicates that the IP address of the second UE is allocated by an operator, then the first S-GW may acquire the information about the second S-GW that serves the second UE from a corresponding operator server, and if the acquired information about the second S-GW is the same as that about the first S-GW, the first S-GW determines that the first S-GW serves both the first UE and the second UE.

Second manner: The first S-GW records quintuple information of the first user data packet; the first S-GW receives a second user data packet sent by a packet data network gateway P-GW that serves the second UE, determines whether quintuple information of the second user data packet is the same as the quintuple information of the first user data packet, and if the quintuple information of the second user data packet is the same as the quintuple information of the first user data packet, determines that the first S-GW serves both the first UE and the second UE.

After receiving the user data packet from the S1 interface of the first base station, the first S-GW acquires, according to an IP address of the second UE, information about a second S-GW that serves the second UE, and if the information about the second S-GW is not obtained, the first S-GW records the quintuple information of the first user data packet, where the quintuple information includes: a source IP address, a source port number, a transport layer protocol, a destination IP address, and a destination port number, where the source IP address of the user data packet is an IP address of the first UE, and the destination IP address is the IP address of the second UE. Then, the first S-GW sends, according to an existing routing mechanism, the first user data packer to a first P-GW that serves the first UE. Then, the first P-GW forwards the first user data packet to a second P-GW that serves the second UE; the second P-GW then forwards the first user data packet to the second S-GW that serves the second UE; if the first S-GW serves both the first UE and the second UE, the second P-GW forwards the first user data packet to the first S-GW; when receiving the second user data packet sent by the second P-GW, the first S-GW records the quintuple information of the second user data packet, determines whether the quintuple information of the second user data packet is the same as the quintuple information of the first user data packet; if the quintuple information of the second user data packet is the same as the quintuple information of the first user data packet, the first S-GW determines that the first S-GW serves both the first UE and the second UE; and if the first S-GW serves only the first UE, the second P-GW sends the second user data packet to the second S-GW, and the first S-GW does not receive, from the P-GW, a second user data packet whose quintuple information is completely the same as the first user data packet.

Step 102: If the first S-GW determines that the first S-GW serves both the first UE and the second UE, the first S-GW triggers the first base station to acquire first routing information required for direct communication with a second base station, and triggers the second base station to acquire second routing information required for direct communication with the first base station, so that the first base station and the second base station establish a direct connection according to the first routing information and the second routing information, where the second base station serves the second UE.

When the first S-GW determines that the first S-GW serves both the first UE and the second UE, the first S-GW triggers the first base station and the second base station to establish the direct connection, so that when performing communication, the first base station and the second base station directly forward the data packet to each other, without a need to use the first S-GW. First, the first S-GW needs to trigger the first base station to acquire the first routing information, and trigger the second base station to acquire the second routing information. In a network in which a General Packet Radio Service (GPRS) tunneling protocol (GPRS Tunneling protocol, GTP) is used, the first routing information includes at least the IP address of the second UE, an IP address of the second base station, a second tunnel endpoint identifier (TEID) of a communication tunnel between the first base station and the second base station, the second routing information includes at least the IP address of the first UE, an IP address of the first base station, and a first tunnel endpoint identifier of the communication tunnel between the second base station and the first base station, and a bearer connection between the first base station and the second base station may be understood as a tunnel whose two ends are identified by an IP address and a TEID.

After acquiring the routing information of each other, both the first base station and the second base station establish direct communication with each other according to the routing information of each other, that is, the first base station may directly forward, to the second base station according to the first routing information, the first user data packet sent by the first UE to the second UE, so that the second base station sends the first user data packet to the second UE, without a need to use the first S-GW, and direct communication is performed between the two base stations; a data packet returned by the second UE to the first UE is also directly sent to the first base station by the second base station according to the second routing information, and then the first base station forwards the data packet to the first UE.

According to the method provided in this embodiment, when receiving a first user data packet of first UE sent by a first base station, a first S-GW determines whether the first S-GW serves both the first UE and second UE, where the second UE and the first UE are communication peer ends; and when determining that the first S-GW serves both the first UE and the second UE, the first S-GW triggers the first base station to acquire first routing information required for direct communication with a second base station, and triggers the second base station to acquire second routing information required for direct communication with the first base station, so that the first base station and the second base station can establish a direct connection according to the first routing information and the second routing information, and the connection does not need to be established by using the first S-GW. Therefore, a route between the two base stations is more optimal, and a transmission delay of the data packet is also reduced.

After the first base station and the second base station successfully establish the direct connection, the first S-GW deletes bearer information of the first UE and bearer information of the second UE that are stored by the first S-GW, and if the first S-GW determines, by using recorded the quintuple information of the first user data packet, whether the first S-GW serves both the first UE and the second UE, the first S-GW is further configured to delete the recorded quintuple information.

If the first base station and the second base station fail to establish the direct connection, the first base station and the second base station still establish a connection according to the existing routing mechanism and by using the first S-GW. It should be further noted that if the first S-GW determines that the first S-GW serves only the first UE, and the second S-GW serves the second UE, the first S-GW may trigger establishment of a local route between the first S-GW and the second S-GW, that is, the first S-GW may directly communicate with the second S-GW without using a P-GW; or the first S-GW forwards the data packet to the first P-GW by using an S5/S8 interface between the first S-GW and the first P-GW, and communication is performed according to a noinial bearer between the first UE and the second UE.

The following describes the technical solution of the method embodiment shown in FIG. 1 in detail with reference to several specific embodiments.

Figure 2:
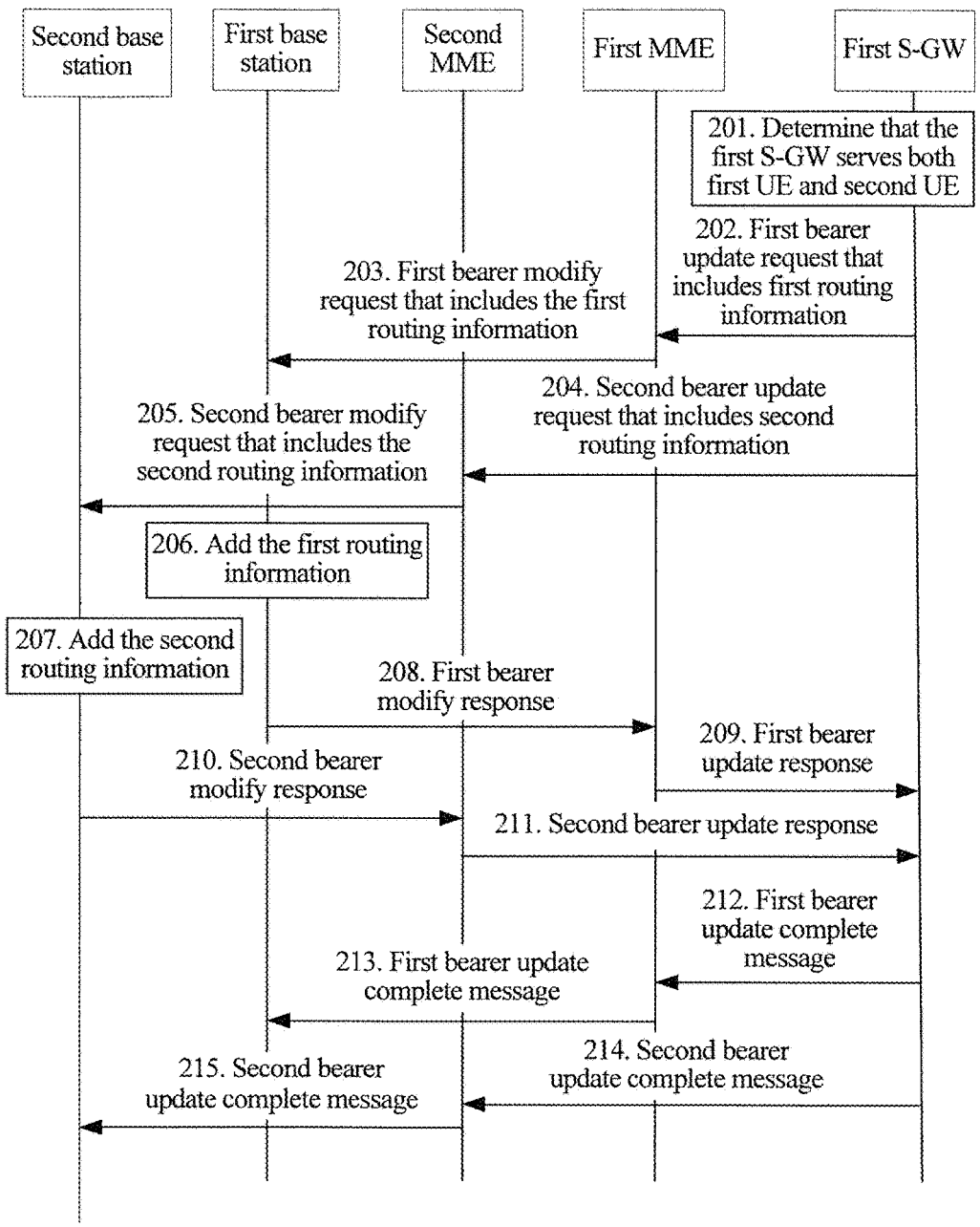
FIG. 2 is a signaling flowchart of another embodiment of a routing method between base stations according to the present invention.

FIG. 2 is a siynaling flowchart of another embodiment of a routing method between base stations according to the present invention. The method provided in this embodiment is based on triggering and establishment of a local route of an S1-MME interface, and the establishment of the local rout herein refers to that a first base station and a second base station establish a direct connection. In this embodiment, a first S-GW sends first routing information to the first base station by using a first MME that serves first UE, and sends second routing information to the second base station by using a second MME that serves second UE, so that the first base station and the second base station establish the direct connection according to the first routing information and the second routing information. The method provided in this embodiment specifically includes the following steps:

Step 201: The first S-GW determines that the first S-GW serves both the first UE and the second UE.

When receiving a first user data packet of the first UE sent by the first base station, the first S-GW determines, according to the first user data packet, whether the first S-GW serves both the first UE and the second UE, where the first UE and the second UE are communication peer ends. For a specific determining method, reference is made to the description of Embodiment 1, and details are not described herein again.

Step 202: The first S-GW sends a first bearer update request that includes the first routing information to the first MME.

The first MME serves the first UE, the first bearer update request may perform communication by using a standard message, that is, an Update Bearer Command message, between an S-GW and an MME, the first bearer update request message includes the first routing information, and the first routing information includes at least an IP address of the second UE, an IP address of the second base station, and a second tunnel endpoint identifier of a communication tunnel between the first base station and the second base station.

Step 203: The first MME sends a first bearer modify request that includes the first routing information to the first base station.

After receiving the first bearer update request sent by the first S-GW, the first MME generates, according to the first bearer update request, the first bearer modify request that includes the first routing information, and sends the first bearer modify request to the first base station.

Step 204: The first S-GW sends a second bearer update request that includes the second routing information to the second MME.

The second MME serves the second UE, the second bearer update request message includes the second routing information, and the second routing information includes an IP address of the first UE, an IP address of the first base station, and a first tunnel endpoint identifier of the communication tunnel between the second base station and the first base station.

Step 205: The second MME sends a second bearer modify request that includes the second routing information to the second base station.

After receiving the second bearer update request sent by the first S-GW, the second MME generates the second bearer modify request that includes the second routing information, and sends the second bearer modify request to the second base station.

Step 206: The first base station adds the first routing information.

After receiving the first bearer modify request, the first base station adds the first routing information, where the first routing information includes the IP address of the second UE, the IP address of the second base station, and the second tunnel endpoint identifier; and the first base station establishes the direct connection with the second base station according to the IP address of the second base station and the second tunnel endpoint identifier, and when communicating with the second base station, the first base station forwards the data packet to the second UE according to the IP address of the second UE.

Step 207: The second base station adds the second routing information.

After receiving the second bearer modify request message, the second base station adds the second routing information, where the second routing information includes the IP address of the first UE, the IP address of the first base station, and the first tunnel endpoint identifier; and the second base station establishes the direct connection with the first base station according to the IP address of the first base station and the first tunnel endpoint identifier, and forwards the data packet to the first UE according to the IP address of the first UE.

Step 208: The first base station returns a first bearermodify response to the first MME.

The first bearer modify response is a response to the first bearer modify request.

Step 209: The first MME returns a first bearer update response to the first S-GW.

The first bearer update response is a response to the first bearer update request.

Step 210: The second base station returns a second bearer modify response to the second MME.

The second bearer modify response is a response to the second bearer modify request.

Step 211: The second MME returns a second bearer update response to the first S-GW.

The second bearer update response is a response to the second bearer update request.

Step 212: The first S-GW sends a first bearer update complete message to the first MME.

After receiving the first bearer update response and the second bearer update response, if the first S-GW determines that the first base station and the second base station successfully establish the direct connection, the first S-GW sends the bearer update complete message to the first base station and the second base station, to notify the first base station and the second base station that establishment of the direct connection is completed.

Step 213: The first MME forwards the first bearer update complete message to the first base station.

Step 214: The first S-GW sends a second bearer update complete message to the second MME.

Step 215: The second MME forwards the second bearer update complete message to the second base station.

If the first base station and the second base station indicate, according to the received bearer update complete message, that establishment of the direct connection is completed, the first base station and the second base station may transmit data to each other by using the established direct connection, and if establishment of the direct connection fails, the first base station and the second base station transmit data according to an existing routing and forwarding mechanism.

According to the method provided in this embodiment, a first S-GW sends a first bearer update request that includes first routing information to a first MME, and sends a second bearer update request that includes second routing information to a second MME, to trigger establishment of a local route, and the first base station and the second base station establish a direct connection by adding the first routing information and the second routing information, and send data by using the established direct connection, which can reduce a transmission delay of a data packet.

Figure 3:
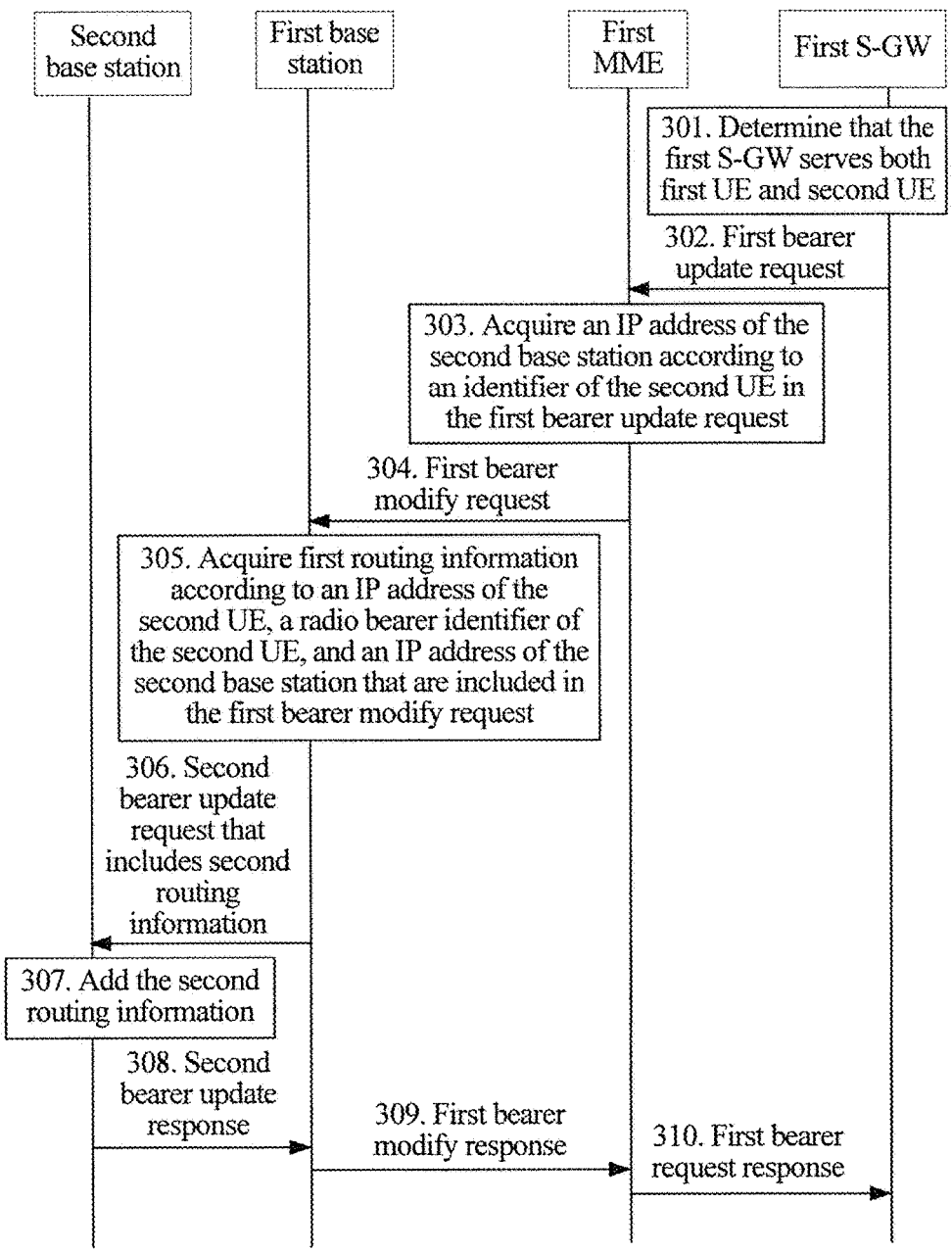
FIG. 3 is a signaling flowchart of still another embodiment of a routing method between base stations according to the present invention.

FIG. 3 is a signaling flowchart of still another embodiment of a routing method between base stations according to the present invention. The method provided in this embodiment is based on triggering of a local route of an S1-MME interface, and based on establishment of a local route of an X2 interface. In this embodiment, a first S-GW sends a first bearer update request to a first MME that serves first UE, where the first update bearer request message includes an identifier of second UE and a radio bearer identifier of the second UE, so that the first MME acquires an IP address of a second base station according to the identifier of the second UE, adds the radio bearer identifier of the second UE and the IP address of the second base station to a first bearer modify request, and sends the first bearer modify request to a first base station, and the first base station acquires first routing information according to the first bearer modify request, and sends a second bearer update request to the second base station, where the second bearer update request includes second routing information, so that the first base station and the second base station establish a direct connection according to the first routing information and the second routing information. The method provided in this embodiment specifically includes the following steps:

Step 301: The first S-GW determines that the first S-GW serves both the first UE and the second UE.

When receiving a first user data packet of the first UE sent by the first base station, the first S-GW determines, according to the first user data packet, whether the first S-GW serves both the first UE and the second UE. For a specific determining method, reference is made to the description of Embodiment 1, and details are not described herein again.

Step 302: The first S-GW sends the first bearer update request to the first MME.

The first update bearer request message includes an IP address of the second UE, the identifier of the second UE, and the radio bearer identifier of the second UE, where the identifier of the second UE may be an international mobile subscriber identity (IMSI) of the second UE.

Step 303: The first MME acquires the IP address of the second base station according to the identifier of the second UE in the first bearer update request.

After receiving the first bearer update request, the first MME acquires the IP address of the second base station according to the identifier of the second UE included in the first bearer update request. For example, the first MME acquires, from a subscriber server (HSS) according to the IMSI of the second UE, information about the second base station that serves the second UE, to acquire the IP address of the second base station.

Step 304: The first MME sends a first bearer modify request to the first base station.

After acquiring the IP address of the second base station, the first MME adds the IP address of the second UE, the IP address of the second base station, and the radio bearer identifier of the second UE to the first bearer modify request and sends the first bearer modify request to the first base station, where the first bearer modify request may further include the identifier of the second UE.

Step 305: The first base station acquires the first routing information according to the IP address of the second UE, the radio bearer identifier of the second UE, and the IP address of the second base station that are included in the first bearer modify request.

Specifically, the first bearer update request message includes the IP address of the second UE and the IP address of the second base station, and the first base station needs to acquire a second endpoint identifier according to only the radio bearer identifier of the second UE, where the radio bearer identifier is in a one-to-one correspondence with the second endpoint identifier, so that the first base station can acquire the second endpoint identifier according to the radio bearer identifier of the second UE, to acquire the first routing information.

Step 306: The first base station sends the second bearer update request that includes the second routing information to the second base station.

After acquiring the first routing information, the first base station sends the second bearer update request to the second base station, where the second bearer update request includes the second routing information, and the second routing information includes an IP address of the first base station, a first endpoint identifier, and an IP address of the first UE.

Step 307: The second base station adds the second routing information.

Step 308: The second base station returns a second bearer update response to the first base station.

The second bearer update response is a response to the second bearer update request.

Step 309: The first base station returns a first bearer modify response to the first MME.

The first bearer modify response is a response to the first bearer modify request.

Step 310: The first MME returns a first bearer update response to the first S-GW.

The first bearer update response is a response to the first bearer update request.

After receiving the first bearer update response, the first S-GW separately sends a bearer update complete message to the first base station and the second base station, to notify the first base station and the second base station that a bearer update is completed. For details, reference may be made to the description of Embodiment 3, and details are not described herein again.

According to the method provide in this embodiment, a first S-GW sends a first bearer update request that includes an identifier of second UE and a radio bearer identifier of the second UE to a first MME, to trigger establishment of a local route, a first base station acquires first routing information according to a first bearer modify request that is sent by the first MME and includes the radio bearer identifier of the second UE, an IP address of a second base station, and an IP address of the second UE, and then the first base station sends second routing information to the second base station, so that the first base station and the second base station establish a direct connection.

Figure 4:
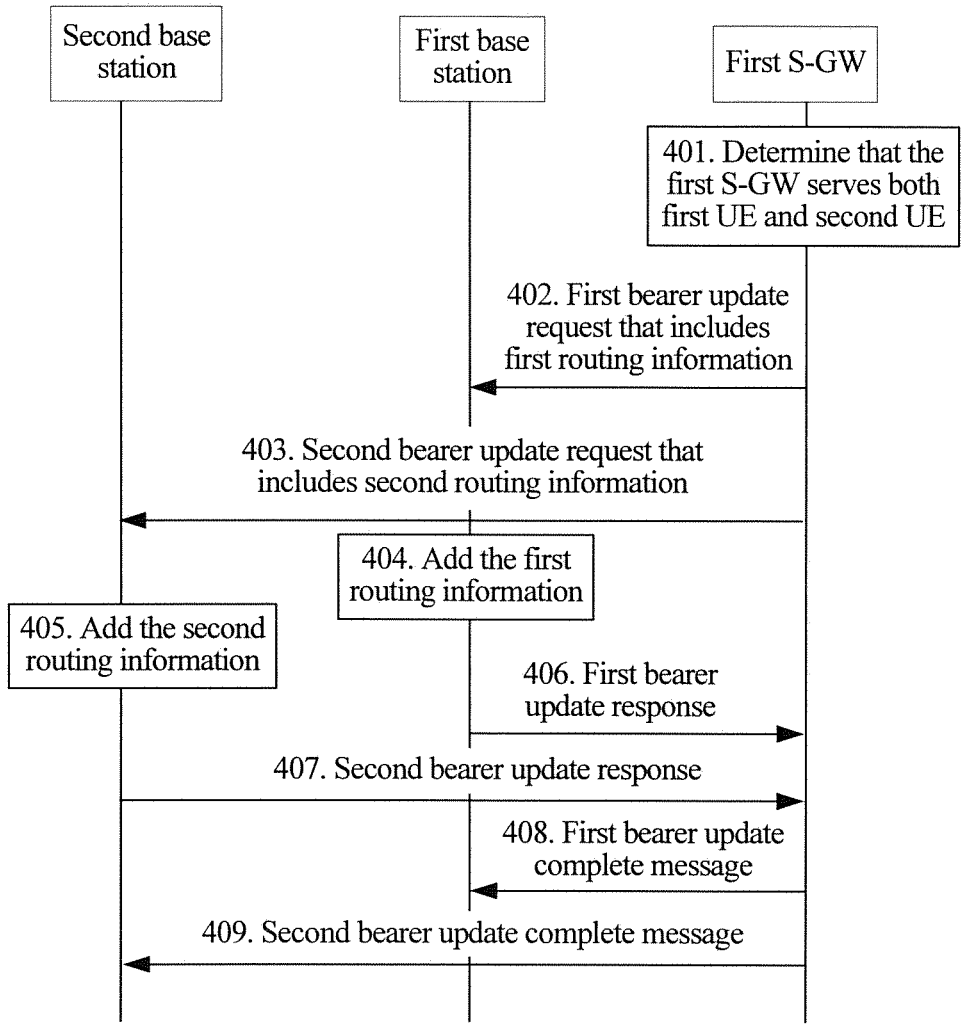
FIG. 4 is a signaling flowchart of a still further embodiment of a routing method between base stations according to the present invention.

FIG. 4 is a signaling flowchart of a still further embodiment of a routing method between base stations according to the present invention. The method provided in this embodiment is based on triggering and establishment of a local route of an S1-U interface. In this embodiment, a first S-GW directly sends a first bearer update request to a first base station, where the first bearer update request includes first routing information; and directly sends a second bearer update request to a second base station, where the second bearer update request message includes second routing information, so that the first base station and the second base station establish a direct connection according to the first routing information and the second routing information. The method provided in this embodiment specifically includes the following steps:

Step 401: The first S-GW determines that the first S-GW serves both first UE and second UE.

When receiving a first user data packet of the first UE sent by the first base station, the first S-GW determines, according to the first user data packet, whether the first S-GW serves both the first UE and the second UE. For a specific determining method, reference is made to the description of Embodiment 1, and details are not described herein again.

Step 402: The first S-GW sends the first bearer update request that includes the first routing information to the first base station.

The first bearer update request includes the first routing information, where the first routing information includes an IP address of the second UE, an IP address of the second base station, and a second tunnel endpoint identifier of a communication tunnel between the first base station and the second base station, and the first bearer update request further includes an identifier of the second UE, where the identifier of the second UE may be an IMSI of the second UE, and the first base station can determine, according to the identifier of the second UE, UE for which the local route is established.

Step 403: The first S-GW sends the second bearer update request that includes the second routing information to the second base station.

The second routing information includes an IP address of the first UE, an IP address of the first base station, and a first tunnel endpoint identifier of the communication tunnel between the second base station and the first base station, and the second bearer update request further includes an identifier of the first UE, and the second base station can determine, according to the identifier of the first UE, UE for which the local route is established.

Step 404: The first base station adds the first routing information.

Step 405: The second base station adds the second routing information.

Step 406: The first base station returns a first bearer update response to the first S-GW.

Step 407: The second base station returns a second bearer update response to the first S-GW.

Step 408: The first S-GW sends a first bearer update complete message to the first base station.

Step 409: The first S-GW sends a second bearer update complete message to the second base station.

According to the method provided in this embodiment, a first S-GW adds routing information of a communication peer to a bearer update request, and directly sends the bearer update request to a base station, to trigger a first base station and a second base station to establish a direct connection according to the routing information of each other.

Figure 5:
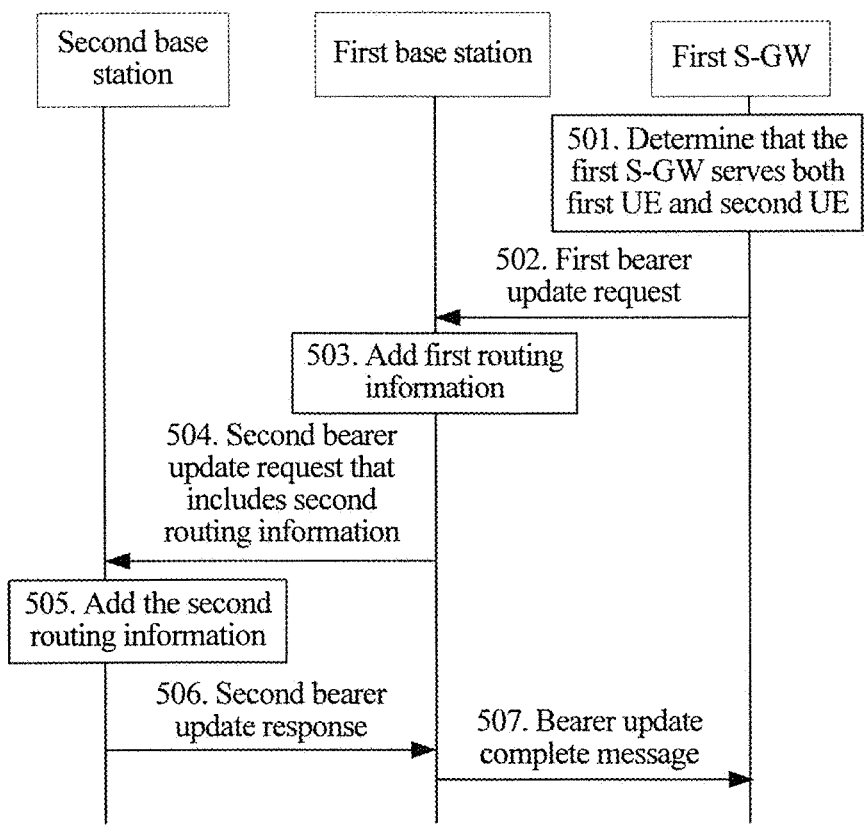
FIG. 5 is a signaling flowchart of yet another embodiment of a routing method between base stations according to the present invention.

FIG. 5 is a signaling flowchart of yet another embodiment of a routing method between base stations according to the present invention. The method provided in this embodiment is based on triggering of a local route of an S1-U interface, and based on establishment of a local route of an X2 interface. In this embodiment, a first S-GW sends a first bearer update request to a first base station, where the first bearer update request message includes an IP address of a second base station and a radio bearer identifier of second UE, so that the first base station sends a second bearer update request to the second base station according to the IP address of the second base station, where the second bearer update request includes second routing information and the radio bearer identifier of the second UE, so that the second base station acquires first routing information according to the second bearer update request, and sends the first routing information to the first base station, so that the first base station and the second base station establish a direct connection according to the first routing information and the second routing information. The method provided in this embodiment specifically includes the following steps:

Step 501: The first S-GW determines that the first serving gateway serves both the first UE and the second UE.

When receiving a first user data packet of the first UE sent by the first base station, the first S-GW determines, according to the first user data packet, whether the first serving gateway serves both the first UE and the second UE. For a specific determining method, reference is made to the description of Embodiment 1, and details are not described herein again.

Step 502: The first S-GW sends the first bearer update request to the first base station.

The first bearer update request includes an IP address of the second UE, an identifier of the second UE, the IP address of the second base station, and the radio bearer identifier of the second UE, where the identifier of the second UE may be an IMSI of the second UE, and the first base station can determine, according to the identifier of the second UE, UE for which the local route is established. If the IP address of the second base station is not stored in the first S-GW, the first S-GW further needs to acquire the IP address of the second base station in advance, and the first S-GW may acquire the IP address of the second base station from a second MME that serves the second UE. Specifically, the first S-GW may send a request message to the second MME to acquire the IP address of the second base station from the second MME, where the request message includes the identifier of the second UE, so that the second MME finds, according to the identifier of the second UE, the second base station that currently serves the second UE, and then the second MME sends the IP address of the second base station to the first S-GW.

Step 503: The first base station adds the first routing information.

After receiving the first bearer update request sent by the first S-GW, the first base station acquires a second tunnel endpoint identifier according to the radio bearer identifier of the second UE in the first bearer update request, and then adds the first routing information.

Step 504: The first base station sends the second bearer update request that includes the second routing information to the second base station.

The second routing information includes an IP address of the first UE, an IP address of the first base station, and a first tunnel endpoint identifier, and the second bearer update request further includes a radio bearer identifier of the first UE and an identifier of the first UE. The first base station sends the second bearer update request to the second base station according to the IP address of the second base station in the first bearer request message.

Step 505: The second base station adds the second routing information.

Step 506: The second base station returns a second bearer update response to the first base station.

Step 507: The first base station returns a bearer update complete message to the first S-GW.

According to the method provided in this embodiment, a first S-GW sends a first bearer update request to a first base station, to trigger establishment of a local route, the first base station sends a second bearer update request that includes second routing information to a second base station, the second base station acquires first routing information according to a radio bearer identifier of second UE included in the second radio bearer update request, and the second base station sends the first routing information to the first base station, so that the first base station and the second base station establish a direct connection according to the first routing information and the second routing information.

Figure 6:
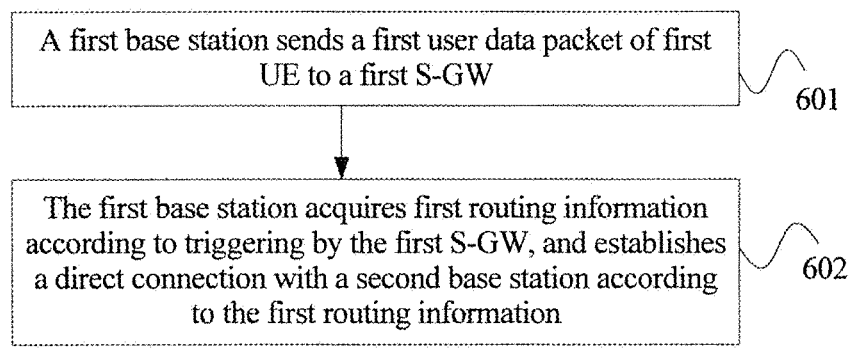
FIG. 6 is a flowchart of still another embodiment of a routing method between base stations according to the present invention.

FIG. 6 is a flowchart of still another embodiment of a routing method between base stations according to the present invention. As shown in FIG. 6, the method in this embodiment includes the following steps:

Step 601: A first base station sends a first user data packet of first UE to a first S-GW.

When a data packet of the first UE is to be sent to the first S-GW, the first UE sends the first user data packet to the first base station by using a radio bearer between the first UE and the first base station; after receiving the first user data packet, the first base station sends the first user data packet of the first UE to the first S-GW, so that the first S-GW determines, according to the first user data packet, whether the first S-GW serves both the first UE and second UE; when the first S-GW determines that the first S-GW serves both the first UE and the second UE, the first S-GW triggers the first base station to acquire first routing information required for direct communication with a second base station, and triggers the second base station to acquire second routing information required for communication with the first base station, so that the first base station and the second base station establish a direct connection according to the first routing information and the second routing information.

The first user data packet includes an IP address of the second UE, the second UE is a communication peer end of the first UE, and the second base station serves the second UE. For determining, by the S-GW according to the first user data packet, whether the first S-GW serves both the first UE and the second UE, reference may be made to the description of Embodiment 1, and details are not described herein again.

Step 602: The first base station acquires first routing information according to triggering by the first S-GW, and establishes a direct connection with a second base station according to the first routing information.

The first base station acquires the first routing information according to the triggering by the first S-GW. In a network in which a General Packet Radio Service tunneling protocol is used, the first routing information includes at least the IP address of the second UE, an IP address of the second base station, and a second tunnel endpoint identifier TEID of a communication tunnel between the first base station and the second base station. Correspondingly, the second base station also acquires the second routing information according to the triggering by the first S-GW, where the second routing information includes at least an IP address of the first UE, an IP address of the first base station, and a first tunnel endpoint identifier.

According to the method provided in this embodiment, when receiving a first user data packet sent by first UE, a first base station sends the first user data packet to a first S-GW; when determining, according to the first user data packet, that the first S-GW serves both the first UE and second UE, the first S-GW triggers the first base station to acquire first routing information required for direct communication with a second base station; and the first base station acquires the first routing information according to the triggering by the first S-GW, and establishes a direct connection with the second base station according to the first routing information, so that a route between the two base stations is more optimal, and a transmission delay of a data packet is also reduced.

Based on Embodiment 6, in step 602, the first base station specifically acquires the first routing information in the following manners:

First manner: The first base station receives a first bearer update request sent by the first S-GW by using a first MME that serves the first UE, where the first bearer update request includes the first routing information.

Specifically, when the first S-GW determines that the first S-GW serves both the first UE and the second UE, the first S-GW adds the first routing information to the first bearer update request and sends the first bearer update request to the first MME; after receiving the first bearer update request, the first MME generates a first bearer modify request that includes the first routing information and sends the first bearer modify request to the first base station; and after receiving the first bearer modify request, the first base station adds the first routing information. Correspondingly, the first S-GW also sends a second bearer update request that includes the second routing information to a second MME, the second MME adds the second routing information to a second bearer modify request and sends the second bearer modify request to the second base station, and the second base station adds the second routing information.

Second manner: The first base station receives a first bearer update request sent by the first serving gateway, where the first bearer update request includes the first routing information.

In this manner, when the first S-GW determines that the first S-GW serves both the first UE and the second UE, the first S-GW adds the first routing information to the first bearer update request, sends the first bearer update request to the first base station, adds the second routing information to a second bearer update request, and sends the second bearer update request to the second base station, and after receiving the first bearer update request, the first base station adds the first routing information.

Third manner: First, the first base station receives a first bearer modify request sent by a first MME that serves the first UE. Then, the first base station acquires the first routing information according to the IP address of the second UE, a radio bearer identifier of the second UE, and the IP address of the second base station that are included in the first bearer modify request; finally, the first base station sends a second bearer update request to the second base station, where the second bearer update request includes the second routing information, so that the first base station and the second base station establish the direct connection according to the first routing information and the second routing information.

The first bearer modify request includes the IP address of the second UE, an identifier of the second UE, the IP address of the second base station, and the bearer identifier of the second UE, and the first bearer modify request is sent to the first base station in a process in which after receiving a first bearer update request sent by the first S-GW, the first MME acquires the IP address of the second base station according to the identifier of the second UE included in the first update bearer request message, and adds the IP address of the second base station to the first bearer modify request. That the first base station acquires the first routing information according to the first bearer update request is specifically: the first base station acquires the IP address of the second base station and the IP address of the second UE by means of parsing, and determines the second tunnel endpoint identifier according to the bearer identifier of the second UE.

Fourth manner: First, the first base station receives a first bearer update request sent by the first serving gateway, where the first bearer update request message includes the IP address of the second UE, an identifier of the second UE, the IP address of the second base station, and a radio bearer identifier of the second UE. Then, the first base station acquires the first routing information according to the first bearer update request, and sends a second bearer update request to the second base station according to the IP address of the second base station, where the second bearer update request includes the second routing information, so that the first base station and the second base station establish the direct connection according to the first routing information and the second routing information.

Figure 7:
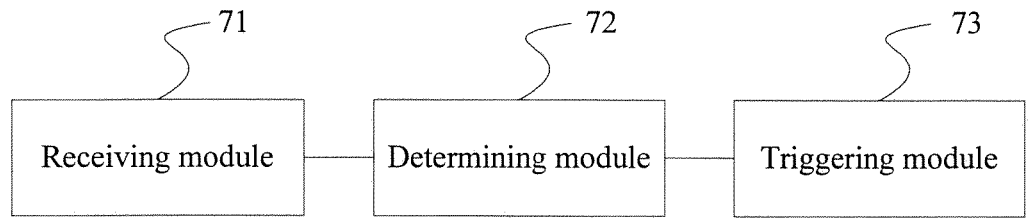
FIG. 7 is a schematic structural diagram of an embodiment of a serving gateway according to the present invention.

FIG. 7 is a schematic structural diagram of an embodiment of a serving gateway according to the present invention. The serving gateway provided in this embodiment is used as a first serving gateway, and as shown in FIG. 7, the serving gateway provided in this embodiment includes:

a receiving module 71, configured to receive a first user data packet of first user equipment UE sent by a first base station;

a determining module 72, configured to determine, according to the first user data packet received by the receiving module 71, whether the first serving gateway serves both the first UE and second UE, where the second UE is a communication peer end of the first UE; and a triggering module 73, configured to: after the determining module 72 determines that the first serving gateway serves both the first UE and the second UE, trigger the first base station to acquire first routing information required for direct communication with a second base station, and trigger the second base station to acquire second routing information required for direct communication with the first base station, so that the first base station and the second base station establish a direct connection according to the first routing information and the second routing information, where the second base station serves the second UE.

The first routing information includes at least an IP address of the second UE, an IP address of the second base station, and a second tunnel endpoint identifier of a communication tunnel between the first base station and the second base station, and the second routing information includes at least an IP address of the first UE, an IP address of the first base station, and a first tunnel endpoint identifier of the communication tunnel between the second base station and the first base station.

The serving gateway provided in this embodiment can be configured to execute the solution provided in the method embodiment shown in FIG. 1. Specific implementation manners and technical effects are similar, and details are not described herein again.

Figure 8:
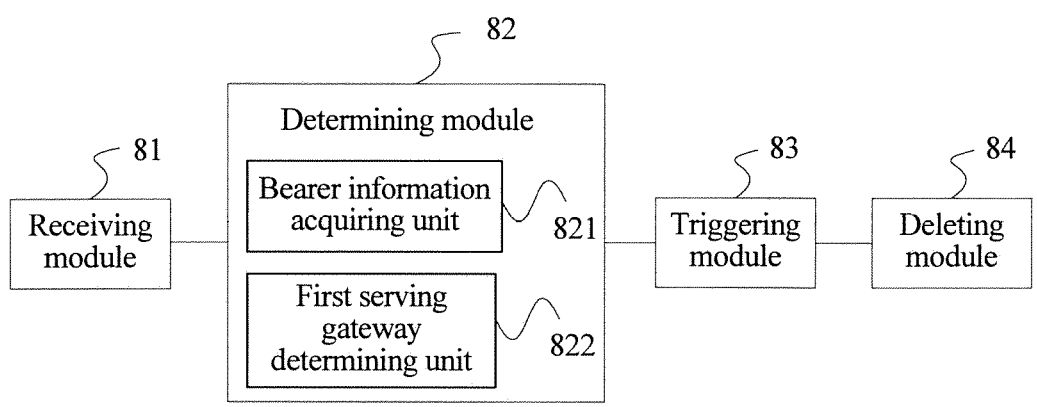
FIG. 8 is a schematic structural diagram of another embodiment of a serving gateway according to the present invention.

FIG. 8 is a schematic structural diagram of another embodiment of a serving gateway according to the present invention. As shown in FIG. 8, the serving gateway provided in this embodiment includes:

a receiving module 81, configured to receive a first user data packet of first user equipment UE sent by a first base station;

a determining module 82, configured to determine, according to the first user data packet received by the receiving module 81, whether the first serving gateway serves both the first UE and second UE, where the second UE is a communication peer end of the first UE; and a triggering module 83, configured to: after the determining module 82 determines that the first serving gateway serves both the first UE and the second UE, trigger the first base station to acquire first routing information required for direct communication with a second base station, and trigger the second base station to acquire second routing information required for direct communication with the first base station, so that the first base station and the second base station establish a direct connection according to the first routing information and the second routing information, where the second base station serves the second UE.

The first routing information includes at least an IP address of the second UE, an IP address of the second base station, and a second tunnel endpoint identifier of a communication tunnel between the first base station and the second base station, and the second routing information includes at least an IP address of the first UE, an IP address of the first base station, and a first tunnel endpoint identifier of the communication tunnel between the second base station and the first base station.

The determining module 82 includes: a bearer information acquiring unit 821, configured to acquire bearer information of the second UE according to the IP address of the second UE included in the first user data packet, where the bearer information of the second UE includes information about a second serving gateway that serves the second UE; and a first serving gateway determining unit 822, configured to determine, according to the information that is included in the bearer information of the second UE and is about the second serving gateway that serves the second UE, whether the first serving gateway also serves the second UE, and if it is determined that the first serving gateway also serves the second UE, determine that the first serving gateway serves both the first UE and the second UE.

Optionally, the triggering module 83 is specifically configured to: send the first routing information to the first base station by using a first mobility management entity MME that serves the first UE, and send the second routing information to the second base station by using a second MME that serves the second UE, so that the first base station and the second base station establish the direct connection according to the first routing information and the second routing information.

Optionally, the triggering module 83 is specifically configured to: send a first bearer update request to a first MME that serves the first UE, where the first update bearer request message includes the IP address of the second UE, an identifier of the second UE, and a radio bearer identifier of the second UE, so that the first MME acquires the IP address of the second base station according to the identifier of the second UE, and sends a first bearer modify request to the first base station, where the first bearer modify request includes the IP address of the second UE, the radio bearer identifier of the second UE, and the IP address of the second base station, so that the first base station acquires the first routing information according to the IP address of the second UE, the radio bearer identifier of the second UE, and the IP address of the second base station that are included in the first bearer modify request, and sends a second bearer update request to the second base station, where the second bearer update request includes the second routing information, so that the first base station and the second base station establish the direct connection according to the first routing information and the second routing information.

Optionally, the triggering module 83 is specifically configured to: send a first bearer update request to the first base station, where the first bearer update request includes the first routing information; and send a second bearer update request to the second base station, where the second bearer update request message includes the second routing information, so that the first base station and the second base station establish the direct connection according to the first routing information and the second routing information.

Optionally, the triggering module 83 is specifically configured to send a first bearer update request to the first base station, where the first bearer update request message includes the IP address of the second UE, an identifier of the second UE, the IP address of the second base station, and a radio bearer identifier of the second UE, so that the first base station acquires the first routing information according to the first bearer update request, and sends a second bearer update request to the second base station according to the IP address of the second base station, where the second bearer update request includes the second routing information, so that the first base station and the second base station establish the direct connection according to the first routing information and the second routing information.

The serving gateway provided in this embodiment further includes: a deleting module 84, configured to: after the first base station and the second base station successfully establish the direct connection, delete bearer information of the first UE stored by the first serving gateway, and delete the bearer information of the second UE.

The serving gateway provided in this embodiment can be configured to execute the solutions provided in the method embodiments shown in FIG. 2 to FIG. 5. Specific implementation manners and technical effects are similar, and details are not described herein again.

Based on Embodiment 8, in a feasible implementation manner, the determining module 82 includes: a recording unit and a second serving gateway determining unit, where the recording unit is configured to record quintuple information of the first user data packet; and the second serving gateway determining unit is configured to: after the receiving module receives a second user data packet sent by a packet data network gateway that serves the second UE, determine whether quintuple information of the second user data packet is the same as the quintuple information of the first user data packet, and if the quintuple information of the second user data packet is the same as the quintuple information of the first user data, determine that the first serving gateway serves both the first UE and the second UE. In this feasible implementation manner, a method for determining, by the determining module, whether the first serving gateway serves both the first UE and the second UE is different from that in Embodiment 8.

Figure 9:
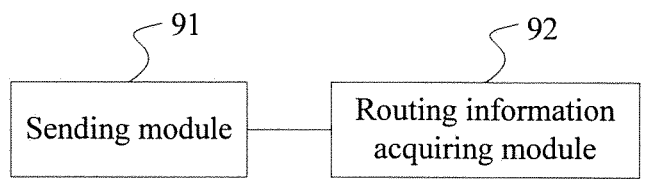
FIG. 9 is a schematic structural diagram of an embodiment of a base station according to the present invention.

FIG. 9 is a schematic structural diagram of an embodiment of a base station according to the present invention. The base station provided in this embodiment is used as a first base station, and as shown in FIG. 9, the base station provided in this embodiment includes:

a sending module 91, configured to send a first user data packet of first UE to a first serving gateway, so that the first serving gateway determines, according to the first user data packet, whether the first serving gateway serves both the first UE and second UE, where if the first serving gateway determines that the first serving gateway serves both the first UE and the second UE, the first serving gateway triggers the first base station to acquire first routing information required for direct communication with a second base station, and triggers the second base station to acquire second routing information required for communication with the first base station, so that the first base station and the second base station establish a direct connection according to the first routing information and the second routing information, where the second UE is a communication peer end of the first UE, and the second base station serves the second UE; and a routing information acquiring module 92, configured to: acquire the first routing information according to the triggering by the first serving gateway, and establish the direct connection with the second base station according to the first routing information.

The first routing information includes an IP address of the second UE, an IP address of the second base station, and a second tunnel endpoint identifier of a communication tunnel between the first base station and the second base station, and the second routing information includes an IP address of the first UE, an IP address of the first base station, and a first tunnel endpoint identifier of the communication tunnel between the second base station and the first base station.

Optionally, the routing information acquiring module 92 is specifically configured to receive a first bearer update request sent by the first serving gateway by using a first MME that serves the first UE, where the first bearer update request includes the first routing information.

Optionally, the routing information acquiring module 92 is specifically configured to: receive a first bearer modify request sent by a first MME that serves the first UE, where the first bearer modify request includes the IP address of the second UE, the IP address of the second base station, and a bearer identifier of the second UE, and the first bearer modify request is sent to the first base station in a process in which after receiving a first bearer update request sent by the first serving gateway, the first MME acquires the IP address of the second base station according to an identifier address of the second UE included in the first update bearer request message, and adds the IP address of the second base station to the first bearer modify request; acquire the first routing information according to the IP address of the second UE, the radio bearer identifier of the second UE, and the IP address of the second base station that are included in the first bearer modify request; and send a second bearer update request to the second base station, where the second bearer update request includes the second routing information, so that the first base station and the second base station establish the direct connection according to the first routing information and the second routing information.

Optionally, the routing information acquiring module 92 is specifically configured to receive a first bearer update request sent by the first serving gateway, where the first bearer update request includes the first routing information.

Optionally, the routing information acquiring module 92 is specifically configured to: receive a first bearer update request sent by the first serving gateway, where the first bearer update request message includes the IP address of the second UE, an identifier of the second UE, the IP address of the second base station, and a radio bearer identifier of the second UE; acquire the first routing information according to the first bearer update request; and send a second bearer update request to the second base station according to the IP address of the second base station, where the second bearer update request includes the second routing information, so that the first base station and the second base station establish the direct connection according to the first routing information and the second routing information.

The base station provided in this embodiment can be configured to execute the method embodiment shown in FIG. 6. Specific implementation manners and technical effects are similar, and details are not described herein again.

Figure 10:
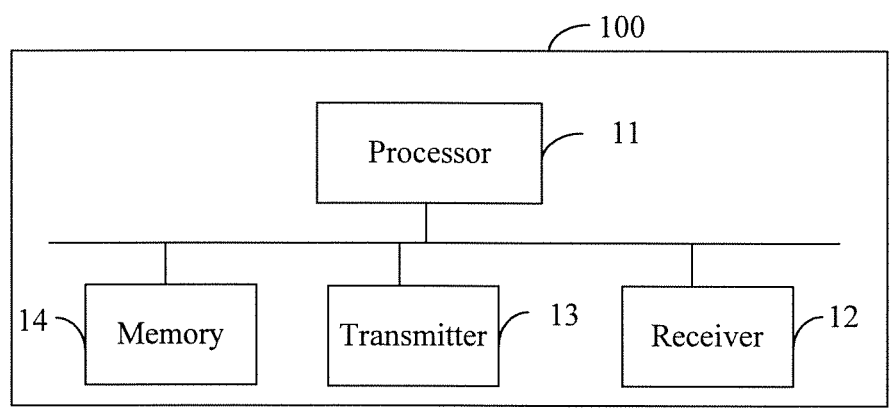
FIG. 10 is a schematic structural diagram of still another embodiment of a serving gateway according to the present invention.

FIG. 10 is a schematic structural diagram of still another embodiment of a serving gateway according to the present invention. In this embodiment, the serving gateway is a first serving gateway, and as shown in FIG. 10, a serving gateway 100 provided in this embodiment includes: a processor 11, a receiver 12, and a transmitter 13, and the serving gateway 100 may further include a memory 14, where the receiver 12, the transmitter 13, and the memory 14 may all be connected to the processor 11 by using a bus. The memory 14 stores an execution instruction. When the serving gateway runs, the processor 11 communicates with the memory 14, and the processor 11 executes the execution instruction, so that the serving gateway executes the routing method that is between base stations and that is provided in this embodiment.

The receiver 12 is configured to receive a first user data packet of first user equipment UE sent by a first base station;

the processor 11 is configured to determine, according to the first user data packet, whether the first serving gateway serves both the first UE and second UE, where the second UE is a communication peer end of the first UE; and the transmitter 13 is configured to: after the processor 11 determines that the first serving gateway serves both the first UE and the second UE, trigger the first base station to acquire first routing information required for direct communication with a second base station, and trigger the second base station to acquire second routing information required for direct communication with the first base station, so that the first base station and the second base station establish a direct connection according to the first routing information and the second routing information, where the second base station serves the second UE.

The first routing information includes an IP address of the second UE, an IP address of the second base station, and a second tunnel endpoint identifier of a communication tunnel between the first base station and the second base station, and the second routing information includes an IP address of the first UE, an IP address of the first base station, and a first tunnel endpoint identifier of the communication tunnel between the second base station and the first base station.

In an optional implementation manner, the processor 11 is specifically configured to: acquire bearer information of the second UE according to the IP address of the second UE included in the first user data packet, where the bearer information includes information about a second serving gateway that serves the second UE; and determine, according to the information that is included in the bearer information of the second UE and is about the second serving gateway that serves the second UE, whether the first serving gateway also serves the second UE, and if it is determined that the first serving gateway also serves the second UE, determine that the first serving gateway serves both the first UE and the second UE.

In another optional implementation manner, the processor 11 is specifically configured to: record quintuple information of the first user data packet; and determine, according to a second user data packet that is received by the receiver 12 and is sent by a packet data network gateway that serves the second UE, whether quintuple information of the second user data packet is the same as the quintuple information of the first user data packet, and if the quintuple information of the second user data packet is the same as the quintuple information of the first user data packet, determine that the first serving gateway serves both the first UE and the second UE.

Optionally, the transmitter 13 is specifically configured to: send the first routing information to the first base station by using a first mobility management entity MME that serves the first UE, and send the second routing information to the second base station by using a second MME that serves the second UE, so that the first base station and the second base station establish the direct connection according to the first routing information and the second routing information.

Optionally, the transmitter 13 is specifically configured to: send a first bearer update request to a first MME that serves the first UE, where the first update bearer request message includes the IP address of the second UE, an identifier of the second UE, and a radio bearer identifier of the second UE, so that the first MME acquires the IP address of the second base station according to the identifier of the second UE, and sends a first bearer modify request to the first base station, where the first bearer modify request includes the IP address of the second UE, the radio bearer identifier of the second UE, and the IP address of the second base station, so that the first base station acquires the first routing information according to the IP address of the second UE, the radio bearer identifier of the second UE, and the IP address of the second base station that are included in the first bearer modify request, and sends a second bearer update request to the second base station, where the second bearer update request includes the second routing information, so that the first base station and the second base station establish the direct connection according to the first routing information and the second routing information.

Optionally, the transmitter 13 is specifically configured to: send a first bearer update request to the first base station, where the first bearer update request includes the first routing information; and send a second bearer update request to the second base station, where the second bearer update request message includes the second routing information, so that the first base station and the second base station establish the direct connection according to the first routing information and the second routing information.

Optionally, the transmitter 13 is specifically configured to send a first bearer update request to the first base station, where the first bearer update request message includes the IP address of the second UE, an identifier of the second UE, the IP address of the second base station, and a radio bearer identifier of the second UE, so that the first base station acquires the first routing information according to the first bearer update request, and sends a second bearer update request to the second base station according to the IP address of the second base station, where the second bearer update request includes the second routing information, so that the first base station and the second base station establish the direct connection according to the first routing information and the second routing information.

The processor 11 is further configured to: after the first base station and the second base station successfully establish the direct connection, delete bearer information of the first UE stored by the first serving gateway, and delete the bearer information of the second UE.

The serving gateway provided in this embodiment can be configured to execute the technical solution provided in any method embodiment described above. Specific implementation manners and technical effects are similar, and details are not described herein again.

Figure 11:
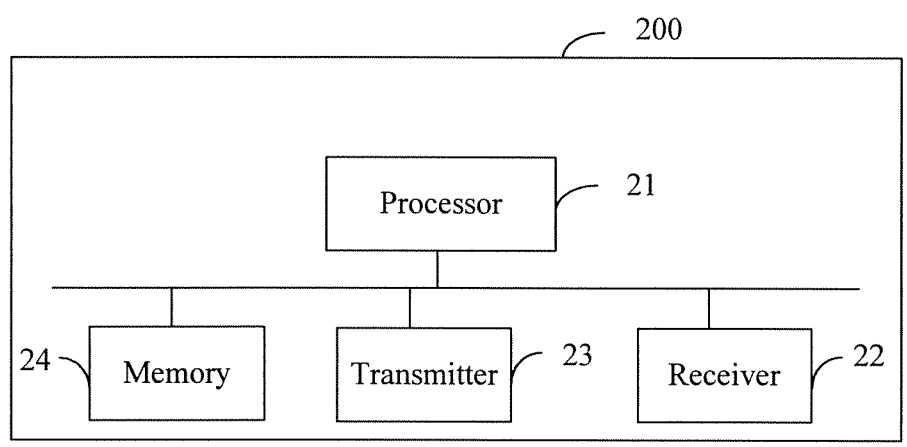
FIG. 11 is a schematic structural diagram of another embodiment of a base station according to the present invention.

FIG. 11 is a schematic structural diagram of another embodiment of a base station according to the present invention. In this embodiment, the base station is a first base station, and as shown in FIG. 11, a base station 200 provided in this embodiment includes: a processor 21, a receiver 22, and a transmitter 23, and the base station 200 may further include a memory 24, where the receiver 22, the transmitter 23, and the memory 24 may all be connected to the processor 21 by using a bus. The memory 24 stores an execution instruction. When the base station runs, the processor 21 communicates with the memory 24, and the processor 21 executes the execution instruction, so that the base station executes the routing method that is between base stations and that is provided in this embodiment.

The transmitter 23 is configured to send a first user data packet of first UE to a first serving gateway, so that the first serving gateway determines, according to the first user data packet, whether the first serving gateway serves both the first UE and second UE, where if the first serving gateway determines that the first serving gateway serves both the first UE and the second UE, the first serving gateway triggers the first base station to acquire first routing information required for direct communication with a second base station, and triggers the second base station to acquire second routing information required for communication with the first base station, so that the first base station and the second base station establish a direct connection according to the first routing information and the second routing information, where the second UE is a communication peer end of the first UE, and the second base station serves the second UE; and the processor 21 is configured to acquire the first routing information according to the triggering by the first serving gateway, and establish the direct connection with the second base station according to the first routing information.

The first routing information includes an IP address of the second UE, an IP address of the second base station, and a second tunnel endpoint identifier of a communication tunnel between the first base station and the second base station, and the second routing information includes an IP address of the first UE, an IP address of the first base station, and a first tunnel endpoint identifier of the communication tunnel between the second base station and the first base station.

The receiver 22 is configured to receive a first bearer update request sent by the first serving gateway by using a first MME that serves the first UE, where the first bearer update request includes the first routing information.

The receiver 22 is further configured to receive a first bearer modify request sent by a first MME that serves the first UE, where the first bearer modify request includes the IP address of the second UE, the IP address of the second base station, and a bearer identifier of the second UE, and the first bearer modify request is sent to the first base station in a process in which after receiving a first bearer update request sent by the first serving gateway, the first MME acquires the IP address of the second base station according to an identifier address of the second UE included in the first update bearer request message, and adds the IP address of the second base station to the first bearer modify request;

the processor 21 is specifically configured to acquire the first routing information according to the IP address of the second UE, the radio bearer identifier of the second UE, and the IP address of the second base station that are included in the first bearer modify request; and the transmitter 23 is further configured to send a second bearer update request to the second base station, where the second bearer update request includes the second routing information, so that the first base station and the second base station establish the direct connection according to the first routing information and the second routing information.

The receiver 22 is further configured to receive a first bearer update request sent by the first serving gateway, where the first bearer update request includes the first routing information.

The receiver 22 is further configured to receive a first bearer update request sent by the first serving gateway, where the first bearer update request message includes the IP address of the second UE, an identifier of the second UE, the IP address of the second base station, and a radio bearer identifier of the second UE;

the processor 21 is specifically configured to acquire the first routing information according to the first bearer update request; and the transmitter 23 is further configured to send a second bearer update request to the second base station according to the IP address of the second base station, where the second bearer update request includes the second routing information, so that the first base station and the second base station establish the direct connection according to the first routing information and the second routing information.

The serving gateway provided in this embodiment can be configured to execute the technical solution provided in any method embodiment described above. Specific implementation manners and technical effects are similar, and details are not described herein again.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A routing method between base stations, the method comprising:
   receiving, by a first serving gateway, a first user data packet of first user equipment (UE) sent by a first base station, and determining, according to the first user data packet, whether the first serving gateway serves both the first UE and a second UE, wherein the second UE is a communication peer end of the first UE; and
   if the first serving gateway determines that the first serving gateway serves both the first UE and the second UE, triggering, by the first serving gateway, the first base station to acquire first routing information required for direct communication with a second base station, and triggering, by the first serving gateway, the second base station to acquire second routing information required for direct communication with the first base station, the first routing information and the second routing information are used for the first base station and the second base station to establish a direct connection, wherein the second base station serves the second UE.

2. The method according to claim 1, wherein:
   the first routing information comprises at least an IP address of the second UE, an IP address of the second base station, and a second tunnel endpoint identifier of a communication tunnel between the first base station and the second base station; and
   the second routing information comprises at least an IP address of the first UE, an IP address of the first base station, and a first tunnel endpoint identifier of the communication tunnel between the second base station and the first base station.

3. The method according to claim 1, wherein determining, according to the first user data packet, whether the first serving gateway serves both the first UE and a second UE comprises:
   acquiring, by the first serving gateway, bearer information of the second UE according to the IP address of the second UE comprised in the first user data packet, wherein the bearer information comprises information about a second serving gateway that serves the second UE; and
   determining, by the first serving gateway according to the information that is comprised in the bearer information of the second UE and is about the second serving gateway that serves the second UE, whether the first serving gateway also serves the second UE, and if the first serving gateway determines that the first serving gateway also serves the second UE, determining, by the first serving gateway, that the first serving gateway serves both the first UE and the second UE.

4. The method according to claim 1, wherein determining, according to the first user data packet, whether the first serving gateway serves both the first UE and a second UE comprises:
   recording, by the first serving gateway, quintuple information of the first user data packet; and
   receiving, by the first serving gateway, a second user data packet sent by a packet data network gateway that serves the second UE, determining whether quintuple information of the second user data packet is the same as the quintuple information of the first user data packet, and if the quintuple information of the second user data packet is the same as the quintuple information of the first user data packet, determining that the first serving gateway serves both the first UE and the second UE.

5. The method according to claim 1, wherein triggering, by the first serving gateway, the first base station to acquire first routing information required for direct communication with a second base station, and triggering, by the first serving gateway, the second base station to acquire second routing information required for direct communication with the first base station, the first routing information and the second routing information are used for the first base station and the second base station to establish a direct connection comprises:
   sending, by the first serving gateway, the first routing information to the first base station by using a first mobility management entity (MME) that serves the first UE, and sending the second routing information to the second base station by using a second MME that serves the second UE, so that the first base station and the second base station establish the direct connection according to the first routing information and the second routing information.

6. A serving gateway, wherein the serving gateway is a first serving gateway and comprises:
   a receiver, configured to receive a first user data packet of first user equipment (UE) sent by a first base station;
   a processor, configured to determine, according to the first user data packet, whether the first serving gateway serves both the first UE and a second UE, wherein the second UE is a communication peer end of the first UE; and
   a transmitter, configured to: after the processor determines that the first serving gateway serves both the first UE and the second UE, trigger the first base station to acquire first routing information required for direct communication with a second base station, and trigger, the second base station to acquire second routing information required for direct communication with the first base station, the first routing information and the second routing information are used for the first base station and the second base station to establish a direct connection, wherein the second base station serves the second UE.

7. The serving gateway according to claim 6, wherein:
   the first routing information comprises at least an IP address of the second UE, an IP address of the second base station, and a second tunnel endpoint identifier of a communication tunnel between the first base station and the second base station; and
   the second routing information comprises at least an IP address of the first UE, an IP address of the first base station, and a first tunnel endpoint identifier of the communication tunnel between the second base station and the first base station.

8. The serving gateway according to claim 6, wherein the processor is configured to:
   acquire bearer information of the second UE according to the IP address of the second UE comprised in the first user data packet, wherein the bearer information comprises information about a second serving gateway that serves the second UE; and
   determine, according to the information that is comprised in the bearer information of the second UE and is about the second serving gateway that serves the second UE, whether the first serving gateway also serves the second UE, and if it is determined that the first serving gateway also serves the second UE, determine that the first serving gateway serves both the first UE and the second UE.

9. The serving gateway according to claim 6, wherein the processor is configured to:
   record quintuple information of the first user data packet; and
   determine, according to a second user data packet that is received by the receiver and is sent by a packet data network gateway that serves the second UE, whether quintuple information of the second user data packet is the same as the quintuple information of the first user data packet, and if the quintuple information of the second user data packet is the same as the quintuple information of the first user data packet, determine that the first serving gateway serves both the first UE and the second UE.

10. The serving gateway according to of claim 6, wherein the transmitter is configured to:
   send the first routing information to the first base station by using a first mobility management entity (MME) that serves the first UE, and send the second routing information to the second base station by using a second MME that serves the second UE, so that the first base station and the second base station establish the direct connection according to the first routing information and the second routing information.

11. The serving gateway according to claim 6, wherein the transmitter is configured to:
   send a first bearer update request to a first mobility management entity (MME) that serves the first UE, wherein the first update bearer request message comprises the IP address of the second UE, an identifier of the second UE, and a radio bearer identifier of the second UE, so that the first MME acquires the IP address of the second base station according to the identifier of the second UE, and sends a first bearer modify request to the first base station, wherein the first bearer modify request comprises the IP address of the second UE, the radio bearer identifier of the second UE, and the IP address of the second base station, so that the first base station acquires the first routing information according to the IP address of the second UE, the radio bearer identifier of the second UE, and the IP address of the second base station that are comprised in the first bearer modify request, and sends a second bearer update request to the second base station, wherein the second bearer update request comprises the second routing information, so that the first base station and the second base station establish the direct connection according to the first routing information and the second routing information.

12. The serving gateway according to claim 6, wherein the transmitter is configured to:
   send a first bearer update request to the first base station, wherein the first bearer update request comprises the first routing information; and
   send a second bearer update request to the second base station, wherein the second bearer update request message comprises the second routing information, so that the first base station and the second base station establish the direct connection according to the first routing information and the second routing information.

13. The serving gateway according to claim 6, wherein the transmitter is configured to:
   send a first bearer update request to the first base station, wherein the first bearer update request message comprises the IP address of the second UE, an identifier of the second UE, the IP address of the second base station, and a radio bearer identifier of the second UE, so that the first base station acquires the first routing information according to the first bearer update request, and sends a second bearer update request to the second base station according to the IP address of the second base station, wherein the second bearer update request comprises the second routing information, so that the first base station and the second base station establish the direct connection according to the first routing information and the second routing information.

14. The serving gateway according to claim 6, wherein the processor is configured to:
   after the first base station and the second base station successfully establish the direct connection, delete bearer information of the first UE stored by the first serving gateway, and delete bearer information of the second UE.

15. A base station, wherein the base station is a first base station and comprises:
   a transmitter, configured to send a first user data packet of first user equipment (UE) to a first serving gateway, so that the first serving gateway determines, according to the first user data packet, whether the first serving gateway serves both the first UE and a second UE, wherein if the first serving gateway serves both the first UE and the second UE, the first serving gateway triggers the first base station to acquire first routing information required for direct communication with a second base station, and the first serving gateway triggers the second base station to acquire second routing information required for communication with the first base station, the first routing information and the second routing information are used for the first base station and the second base station to establish a direct connection, wherein the second UE is a communication peer end of the first UE, and the second base station serves the second UE; and
   a processor, configured to acquire the first routing information according to the triggering by the first serving gateway, and establish the direct connection with the second base station according to the first routing information.

16. The base station according to claim 15, wherein:
   the first routing information comprises at least an IP address of the second UE, an IP address of the second base station, and a second tunnel endpoint identifier of a communication tunnel between the first base station and the second base station; and
   the second routing information comprises at least an IP address of the first UE, an IP address of the first base station, and a first tunnel endpoint identifier of the communication tunnel between the second base station and the first base station.

17. The base station according to claim 15, wherein the base station comprises:
   a receiver, configured to receive a first bearer update request sent by the first serving gateway by using a first mobility management entity (MME) that serves the first UE, wherein the first bearer update request comprises the first routing information.

18. The base station according to claim 15, wherein the base station comprises:
   a receiver, configured to receive a first bearer modify request sent by a first mobility management entity (MME) that serves the first UE, wherein the first bearer modify request comprises the IP address of the second UE, the IP address of the second base station, and a bearer identifier of the second UE, and the first bearer modify request is sent to the first base station in a process in which after receiving a first bearer update request sent by the first serving gateway, the first MME acquires the IP address of the second base station according to an identifier address of the second UE comprised in the first update bearer request message, and adds the IP address of the second base station to the first bearer modify request;

the processor is configured to acquire the first routing information according to the IP address of the second UE, the radio bearer identifier of the second UE, and the IP address of the second base station that are comprised in the first bearer modify request; and the transmitter is further configured to send a second bearer update request to the second base station, wherein the second bearer update request comprises the second routing information, so that the first base station and the second base station establish the direct connection according to the first routing information and the second routing information.

19. The base station according to claim 15, wherein the base station comprises:

a receiver, configured to receive a first bearer update request sent by the first serving gateway, wherein the first bearer update request comprises the first routing information.

20. The base station according to claim 15, wherein the base station comprises:

a receiver, further configured to receive a first bearer update request sent by the first serving gateway, wherein the first bearer update request message comprises the IP address of the second UE, an identifier of the second UE, the IP address of the second base station, and a radio bearer identifier of the second UE;

the processor is configured to acquire the first routing information according to the first bearer update request; and the transmitter is further configured to send a second bearer update request to the second base station according to the IP address of the second base station, wherein the second bearer update request comprises the second routing information, so that the first base station and the second base station establish the direct connection according to the first routing information and the second routing information.

* * * * *